US008719594B2

(12) United States Patent
Dodgson et al.

(10) Patent No.: US 8,719,594 B2
(45) Date of Patent: May 6, 2014

(54) STORAGE AVAILABILITY USING CRYPTOGRAPHIC SPLITTING

(75) Inventors: David Dodgson, Lansdale, PA (US); Joseph Neill, Malvern, PA (US); Ralph Farina, Downingtown, PA (US); Edward Chin, Newtown Square, PA (US); Albert French, Schwenksville, PA (US); Scott Summers, Collegeville, PA (US)

(73) Assignee: Unisys Corporation, Blue Bell, PA (US)

( * ) Notice: Subject to any disclaimer, the term of this patent is extended or adjusted under 35 U.S.C. 154(b) by 319 days.

(21) Appl. No.: 13/397,084

(22) Filed: Feb. 15, 2012

(65) Prior Publication Data

US 2013/0212373 A1 Aug. 15, 2013

(51) Int. Cl.
*H04L 29/06* (2006.01)
*G06F 21/00* (2013.01)

(52) U.S. Cl.
USPC .......................................... 713/193; 714/6.32

(58) Field of Classification Search
None
See application file for complete search history.

(56) References Cited

U.S. PATENT DOCUMENTS

| 2002/0091975 | A1* | 7/2002 | Redlich et al. | 714/699 |
|---|---|---|---|---|
| 2003/0084290 | A1* | 5/2003 | Murty et al. | 713/168 |
| 2004/0030822 | A1* | 2/2004 | Rajan et al. | 711/4 |
| 2008/0034440 | A1* | 2/2008 | Holtzman et al. | 726/27 |
| 2009/0097661 | A1* | 4/2009 | Orsini et al. | 380/279 |

* cited by examiner

*Primary Examiner* — Gilberto Barron, Jr.
*Assistant Examiner* — Abdulhakim Nobahar
(74) *Attorney, Agent, or Firm* — Richard J. Gregson

(57) ABSTRACT

Methods and systems for maintaining data connectivity in a secure data storage network are disclosed. In one aspect, a method includes assigning a volume to a primary secure storage appliance located in a secure data storage network the primary secure storage appliance selected from among a plurality of secure storage appliances located in the secure data storage network, the volume presented as a virtual disk to a client device and mapped to physical storage at each of a plurality of storage systems. The method further includes detecting at one of the plurality of secure storage appliances a failure of the primary secure storage appliance. The method also includes, upon detecting the failure of the primary secure storage appliance, reassigning the volume to a second secure storage appliance from among the plurality of secure storage appliances, thereby rendering the second secure storage appliance a new primary secure storage appliance.

16 Claims, 21 Drawing Sheets

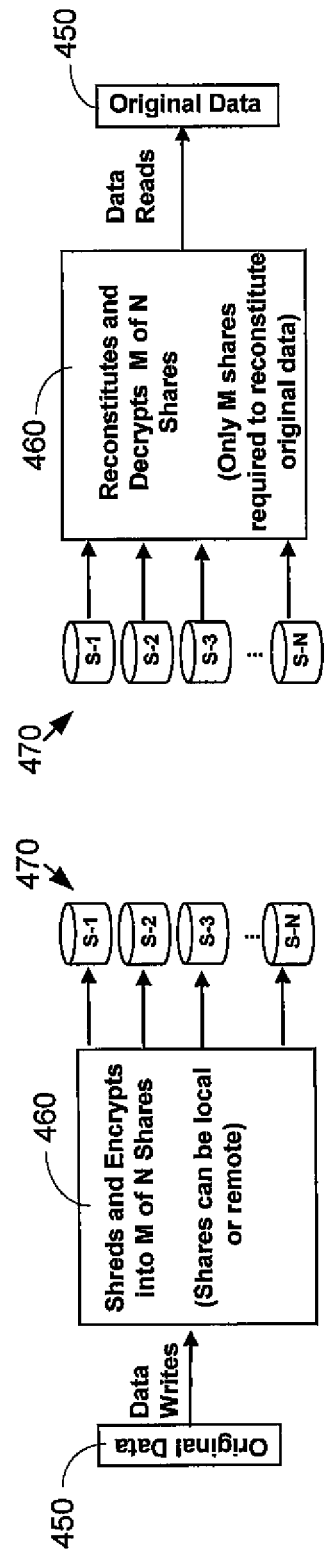

STORAGE AVAILABILITY USING CRYPTOGRAPHIC SPLITTING

RELATED APPLICATIONS

The present disclosure claims the benefit of commonly assigned U.S. patent application Ser. No. 12/272,012, entitled "BLOCK LEVEL DATA STORAGE SECURITY SYSTEM", filed 17 Nov. 2008. The present disclosure also claims the benefit of commonly assigned U.S. patent application Ser. No. 12/336,558, entitled "DATA RECOVERY USING ERROR STRIP IDENTIFIERS", filed 17 Dec. 2008.

The present disclosure is related to commonly assigned, and concurrently filed, U.S. patent application Ser. No. 12/336,559 entitled "STORAGE SECURITY USING CRYPTOGRAPHIC SPLITTING", filed 17 Dec. 2008. The present disclosure is also related to commonly assigned, U.S. patent application Ser. No. 12/336,562, entitled "STORAGE SECURITY USING CRYPTOGRAPHIC SPLITTING", filed 17 Dec. 2008. The present disclosure is related to commonly assigned, U.S. patent application Ser. No. 12/336,564, entitled "STORAGE SECURITY USING CRYPTOGRAPHIC SPLITTING", filed 17 Dec. 2008. The present disclosure is related to commonly assigned, U.S. patent application Ser. No. 12/336,568, entitled "STORAGE SECURITY USING CRYPTOGRAPHIC SPLITTING", filed 17 Dec. 2008.

The present disclosure is related to commonly assigned, and concurrently filed, U.S. patent application Ser. No. 12/342,438, entitled "STORAGE AVAILABILITY USING CRYPTOGRAPHIC SPLITTING", filed 23 Dec. 2008.

The present disclosure is related to commonly assigned, and concurrently filed, U.S. patent application Ser. No. 12/342,547, entitled "STORAGE OF CRYPTOGRAPHICALLY-SPLIT DATA BLOCKS AT GEOGRAPHICALLY-SEPARATED LOCATIONS", filed 23 Dec. 2008. The present disclosure is related to commonly assigned, and concurrently filed, U.S. patent application, Ser. No. 12/342,523, entitled "RETRIEVAL OF CRYPTOGRAPHICALLY-SPLIT DATA BLOCKS FROM FASTEST-RESPONDING STORAGE DEVICES", filed 23 Dec. 2008. The present disclosure is related to commonly assigned, and concurrently filed, U.S. patent application Ser. No. 12/342,500, entitled "BLOCK-LEVEL DATA STORAGE USING AN OUTSTANDING WRITE LIST", filed 23 Dec. 2008.

The present disclosure is related to commonly assigned, and concurrently filed, U.S. patent application Ser. No. 12/342,636, entitled "STORAGE COMMUNITIES OF INTEREST USING CRYPTOGRAPHIC SPLITTING", filed 23 Dec. 2008. The present disclosure is related to commonly assigned, and concurrently filed, U.S. patent application, Ser. No. 12/342,575, entitled "STORAGE COMMUNITIES OF INTEREST USING CRYPTOGRAPHIC SPLITTING", filed 23 Dec. 2008. The present disclosure is related to commonly assigned, and concurrently filed, U.S. patent application Ser. No. 12/342,610, entitled "STORAGE COMMUNITIES OF INTEREST USING CRYPTOGRAPHIC SPLITTING", filed 23 Dec. 2008.

The present disclosure is related to commonly assigned, and concurrently filed, U.S. patent application Ser. No. 12/342,379, entitled "SECURE NETWORK ATTACHED STORAGE DEVICE USING CRYPTOGRAPHIC SPLITTING", filed 23 Dec. 2008.

The present disclosure is related to commonly assigned, and concurrently filed, U.S. patent application Ser. No. 12/342,414, entitled "VIRTUAL TAPE BACKUP ARRANGEMENT USING CRYPTOGRAPHICALLY SPLIT STORAGE", filed 23 Dec. 2008.

These related applications are incorporated by reference herein in its entirety as if it is set forth in this application.

TECHNICAL FIELD

The present disclosure relates generally to data availability in computer networks. In particular, the present disclosure relates to storage availability in cryptographic splitting systems.

BACKGROUND

Modern organizations generate and store large quantities of data. In many instances, organizations store much of their important data at a centralized data storage system. It is frequently important that such organizations be able to quickly access the data stored at the data storage system. In addition, it is frequently important that data stored at the data storage system be recoverable if the data is written to the data storage system incorrectly or if portions of the data stored at the repository is corrupted. Furthermore, it is important that data be able to be backed up to provide security in the event of device failure or other catastrophic event.

The large scale data centers managed by such organizations typically require mass data storage structures and storage area networks that are capable of providing both long-term mass data storage and access capabilities for application servers using that data. Some data security measures are usually implemented in such large data storage networks, and are intended to ensure proper data privacy and prevent data corruption. Typically, data security is accomplished via encryption of data and/or access control to a network within which the data is stored. Data can be stored in one or more locations, e.g. using a redundant array of inexpensive disks (RAID) or other techniques.

One example of an existing mass data storage system 10 is illustrated in FIG. 1. As shown, an application server 12 (e.g. a database or file system provider) connects to a number of storage devices $14_1$-$14_N$ providing mass storage of data to be maintained accessible to the application server via direct connection 15, an IP-based network 16, and a Storage Area Network 18. Each of the storage devices 14 can host disks 20 of various types and configurations useable to store this data.

The physical disks 20 are made visible/accessible to the application server 12 by mapping those disks to addressable ports using, for example, logical unit numbering (LUN), internet SCSI (iSCSI), or common internet file system (CIFS) connection schemes. In the configuration shown, five disks are made available to the application server 12, bearing assigned letters I-M. Each of the assigned drive letters corresponds to a different physical disk 20 (or at least a different portion of a physical disk) connected to a storage device 14, and has a dedicated addressable port through which that disk 20 is accessible for storage and retrieval of data. Therefore, the application server 12 directly addresses data stored on the physical disks 20.

A second typical data storage arrangement 30 is shown in FIG. 2. The arrangement 30 illustrates a typical data backup configuration useable to tape-backup files stored in a data network. The network 30 includes an application server 32, which makes a snapshot of data 34 to send to a backup server 36. The backup server 36 stores the snapshot, and operates a tape management system 38 to record that snapshot to a magnetic tape 40 or other long-term storage device.

These data storage arrangements have a number of disadvantages. For example, in the network 10, a number of data access vulnerabilities exist. An unauthorized user can steal a physical disk 20, and thereby obtain access to sensitive files stored on that disk. Or, the unauthorized user can exploit network vulnerabilities to observe data stored on disks 20 by monitoring the data passing in any of the networks 15, 16, 18 between an authorized application server 12 or other authorized user and the physical disk 20. The network 10 also has inherent data loss risks. In the network 30, physical data storage can be time consuming, and physical backup tapes can be subject to failure, damage, or theft.

To overcome some of these disadvantages, systems have been introduced which duplicate and/or separate files and directories for storage across one or more physical disks. The files and directories are typically stored or backed up as a monolith, meaning that the files are logically grouped with other like data before being secured. Although this provides a convenient arrangement for retrieval, in that a common security construct (e.g. an encryption key or password) is related to all of the data, it also provides additional risk exposure if the data is compromised.

For these and other reasons, improvements are desirable.

SUMMARY

In accordance with the following disclosure, the above and other problems are solved by the following:

In a first aspect, a method for maintaining data connectivity in a secure data storage network is disclosed. In one aspect, a method includes assigning a volume to a primary secure storage appliance located in a secure data storage network the primary secure storage appliance selected from among a plurality of secure storage appliances located in the secure data storage network, the volume presented as a virtual disk to a client device and mapped to physical storage at each of a plurality of storage systems. The method further includes detecting at one of the plurality of secure storage appliances a failure of the primary secure storage appliance. The method also includes, upon detecting the failure of the primary secure storage appliance, reassigning the volume to a second secure storage appliance from among the plurality of secure storage appliances, thereby rendering the second secure storage appliance a new primary secure storage appliance.

In a second aspect, a method of maintaining operation of a plurality of secure storage appliances is disclosed. The method includes assigning a volume to a primary secure storage appliance located in a secure data storage network the primary secure storage appliance selected from among a plurality of secure storage appliances located in the secure data storage network, the volume presented as a virtual disk to a client device and mapped to physical storage at each of a plurality of storage systems. The method further includes presenting an administrative interface to an administrator of the secure data storage network, the administrative interface presenting the plurality of secure storage appliances as a virtual secure storage appliance. The method also includes presenting a common set of administrative settings for each of the plurality of secure storage appliances associated with the virtual secure storage appliance, such that, upon detecting at one of the plurality of secure storage appliances a failure of the primary secure storage appliance, the common set of administrative settings remain accessible to the administrator.

In a third aspect, a secure data storage network is disclosed. The secure data storage network includes a client device, a plurality of storage systems, and a plurality of secure storage appliances interconnected between the client device and the plurality of storage systems, the plurality of secure storage appliances including a primary secure storage appliance associated with a volume, the volume presented as a virtual disk to the client device and mapped to physical storage at each of the plurality of storage systems. In the secure data storage network, each of the plurality of secure storage appliances includes a common set of administrative information, and each of the plurality of secure storage appliances monitors operational status of one or more of a different secure storage appliance among the plurality of secure storage appliances.

BRIEF DESCRIPTION OF THE DRAWINGS

FIG. 8 illustrates dataflow of a write operation according to a possible embodiment of the present disclosure;

FIG. 9 illustrates dataflow of a read operation according to a possible embodiment of the present disclosure;

DETAILED DESCRIPTION

Figure 1:
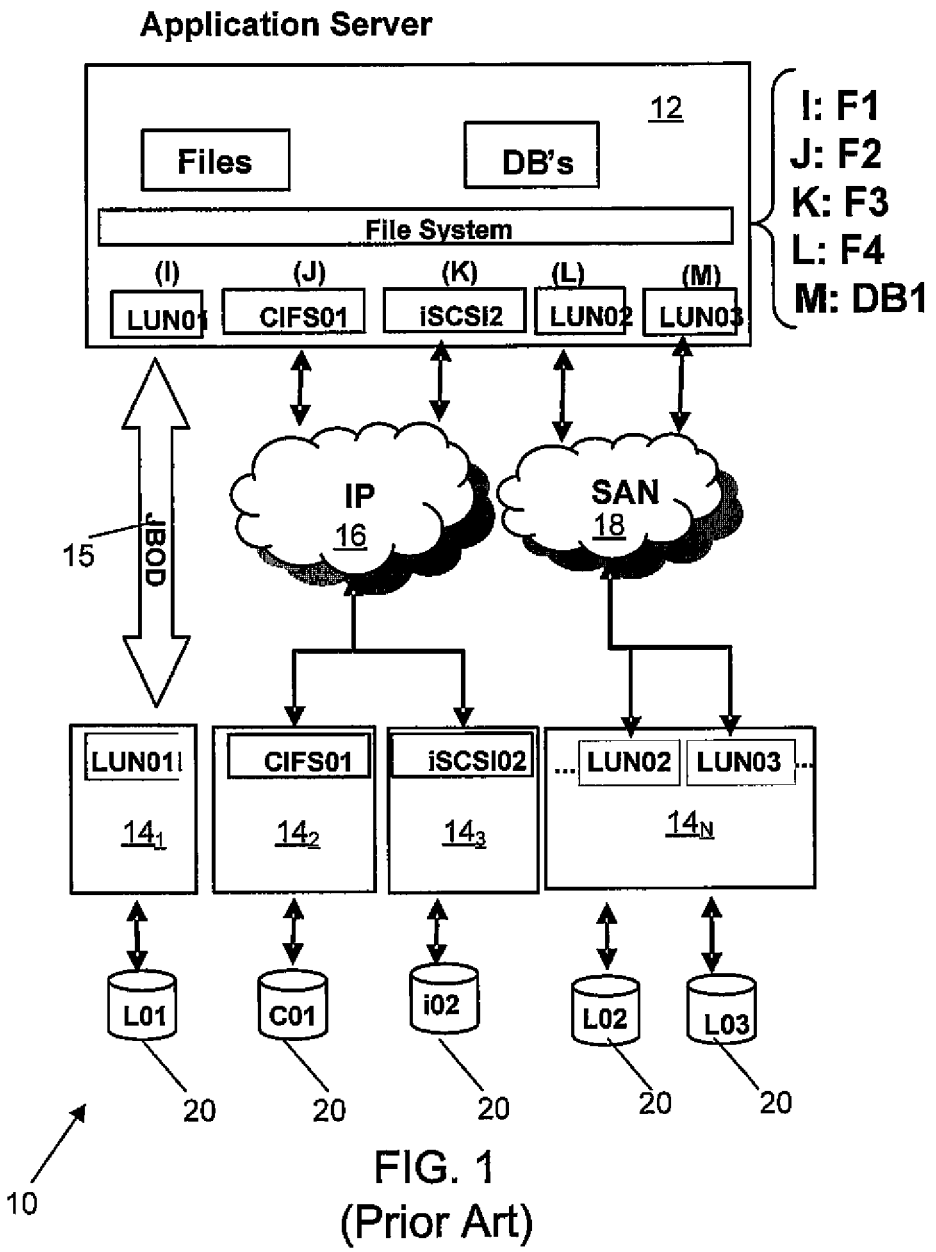
FIG. 1 illustrates an example prior art network providing data storage.
Figure 2:
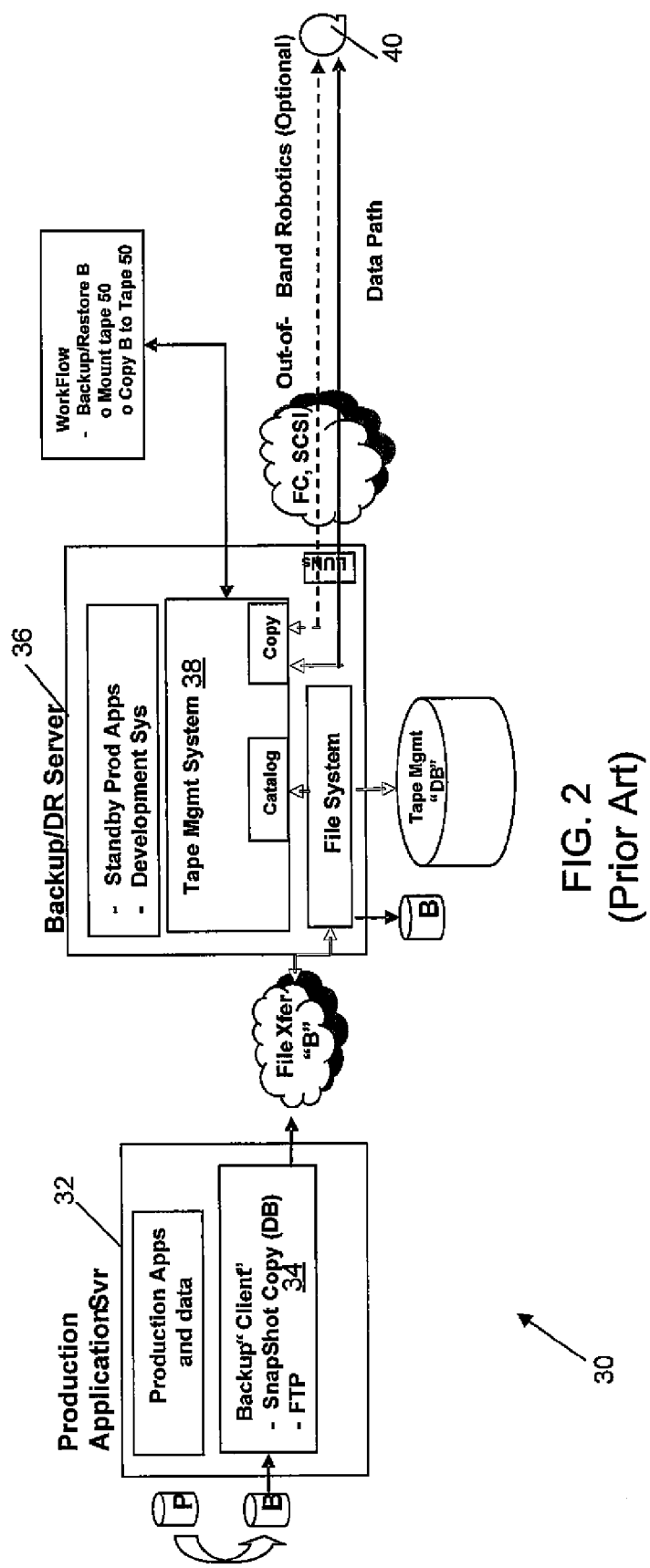
FIG. 2 illustrates an example prior art network providing data backup capabilities.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to a block-level data storage security system. By block-level, it is intended that the data storage and security performed according to the present disclosure is not performed based on the size or arrangement of logical files (e.g. on a per-file or per-directory level), but rather that the data security is based on individual read and write operations related to physical blocks of data. In various embodiments of the present disclosure, the data managed by the read and write operations are split or grouped on a bitwise or other physical storage level. These physical storage portions of files can be stored in a number of separated components, and encrypted. The split, encrypted data improves data security for the data "at rest" on the physical disks, regardless of the access vulnerabilities of physical disks storing the data. This is at least in part because the data cannot be recognizably reconstituted without having appropriate access and decryption rights to multiple, distributed disks. The access rights limitations provided by such a system also makes deletion of data simple, in that deletion of access rights (e.g. encryption keys) provides for effective deletion of all data related to those rights.

The various embodiments of the present disclosure are applicable across a number of possible networks and network configurations; in certain embodiments, the block-level data storage security system can be implemented within a storage area network (SAN) or Network-Attached Storage (NAS). Other possible networks in which such systems can be implemented exist as well.

Figure 3:
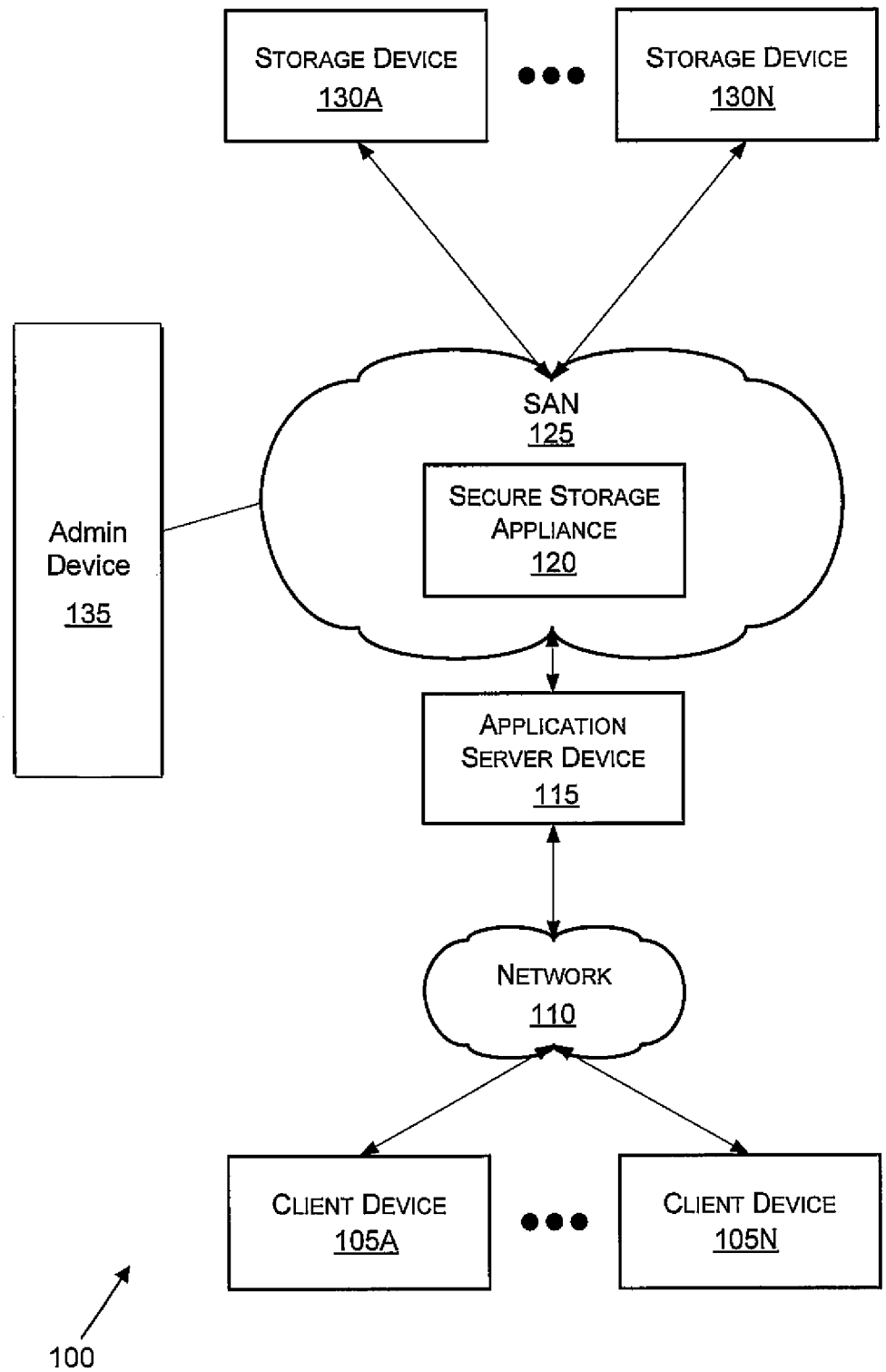
FIG. 3 illustrates a data storage system according to a possible embodiment of the present disclosure.

Referring now to FIG. 3, a block diagram illustrating an example data storage system 100 is shown, according to the principles of the present disclosure. In the example of FIG. 3, system 100 includes a set of client devices 105A through 105N (collectively, "client devices 105"). Client devices 105 can be a wide variety of different types of devices. For example, client devices 105 can be personal computers, laptop computers, network telephones, mobile telephones, television set top boxes, network televisions, video gaming consoles, web kiosks, devices integrated into vehicles, mainframe computers, personal media players, intermediate network devices, network appliances, and other types of computing devices. Client devices 105 may or may not be used directly by human users.

Client devices 105 are connected to a network 110. Network 110 facilitates communication among electronic devices connected to network 110. Network 110 can be a wide variety of electronic communication networks. For example, network 110 can be a local-area network, a wide-area network (e.g., the Internet), an extranet, or another type of communication network. Network 110 can include a variety of connections, including wired and wireless connections. A variety of communications protocols can be used on network 110 including Ethernet, WiFi, WiMax, Transfer Control Protocol, and many other communications protocols.

In addition, system 100 includes an application server 115. Application server 115 is connected to the network 110, which is able to facilitate communication between the client devices 105 and the application server 115. The application server 115 provides a service to the client devices 105 via network 110. For example, the application server 115 can provide a web application to the client devices 105. In another example, the application server 115 can provide a network-attached storage server to the client devices 105. In another example, the application server 115 can provide a database access service to the client devices 105. Other possibilities exist as well.

The application server 115 can be implemented in several ways. For example, the application server 115 can be implemented as a standalone server device, as a server blade, as an intermediate network device, as a mainframe computing device, as a network appliance, or as another type of computing device. Furthermore, it should be appreciated that the application server 115 can include a plurality of separate computing devices that operate like one computing device. For instance, the application server 115 can include an array of server blades, a network data center, or another set of separate computing devices that operate as if one computing device. In certain instances, the application server can be a virtualized application server associated with a particular group of users, as described in greater detail below in FIG. 18.

The application server 115 is communicatively connected to a secure storage appliance 120 that is integrated in a storage area network (SAN) 125. Further, the secure storage appliance 120 is communicatively connected to a plurality of storage devices 130A through 130N (collectively, "storage devices 130"). Similar to the secure storage appliance 120, the storage devices 130 can be integrated with the SAN 125.

The secure storage appliance 120 can be implemented in several ways. For example, the secure storage appliance 120 can be implemented as a standalone server device, as a server blade, as an intermediate network device, as a mainframe computing device, as a network appliance, or as another type of computing device. Furthermore, it should be appreciated that, like the application server 115, the secure storage appliance 120 can include a plurality of separate computing devices that operate like one computing device. In certain embodiments, SAN 125 may include a plurality of secure storage appliances. Each of secure storage appliances 214 is communicatively connected to a plurality of the storage devices 130. In addition, it should be appreciated that the secure storage appliance 120 can be implemented on the same physical computing device as the application server 115.

The application server 115 can be communicatively connected to the secure storage appliance 120 in a variety of ways. For example, the application server 115 can be communicatively connected to the secure storage appliance 120 such that the application server 115 explicitly sends I/O commands to secure storage appliance 120. In another example, the application server 115 can be communicatively connected to secure storage appliance 120 such that the secure storage appliance 120 transparently intercepts I/O commands sent by the application server 115. On a physical level, the application server 115 and the secure storage appliance 120 can be connected via most physical interfaces that support a SCSI command set. Examples of such interfaces include Fibre Channel and iSCSI interfaces.

The storage devices 130 can be implemented in a variety of different ways as well. For example, one or more of the storage devices 130 can be implemented as disk arrays, tape drives, JBODs ("just a bunch of disks"), or other types of electronic data storage devices.

In various embodiments, the SAN 125 is implemented in a variety of ways. For example, the SAN 125 can be a local-area network, a wide-area network (e.g., the Internet), an extranet, or another type of electronic communication network. The SAN 125 can include a variety of connections, including wired and wireless connections. A variety of communications protocols can be used on the SAN 125 including Ethernet, WiFi, WiMax, Transfer Control Protocol, and many other communications protocols. In certain embodiments, the SAN 125 is a high-bandwidth data network provided using, at least in part, an optical communication network employing Fibre Channel connections and Fibre Channel Protocol (FCP) data communications protocol between ports of data storage computing systems.

The SAN 125 additionally includes an administrator device 135. The administrator device 135 is communicatively connected to the secure storage appliance 120 and optionally to the storage devices 130. The administrator device 135 facilitates administrative management of the secure storage appliance 120 and to storage devices. For example, the administrator device 135 can provide an application that can transfer configuration information to the secure storage appliance 120 and the storage devices 130. In another example, the administrator device 135 can provide a directory service used to store information about the SAN 125 resources and also centralize the SAN 125.

In various embodiments, the administrator device 135 can be implemented in several ways. For example, the administrator device 135 can be implemented as a standalone computing device such as a PC or a laptop, or as another type of computing device. Furthermore, it should be appreciated that, like the secure storage appliance 120, the administrator device 135 can include a plurality of separate computing devices that operate as one computing device.

Figure 4:
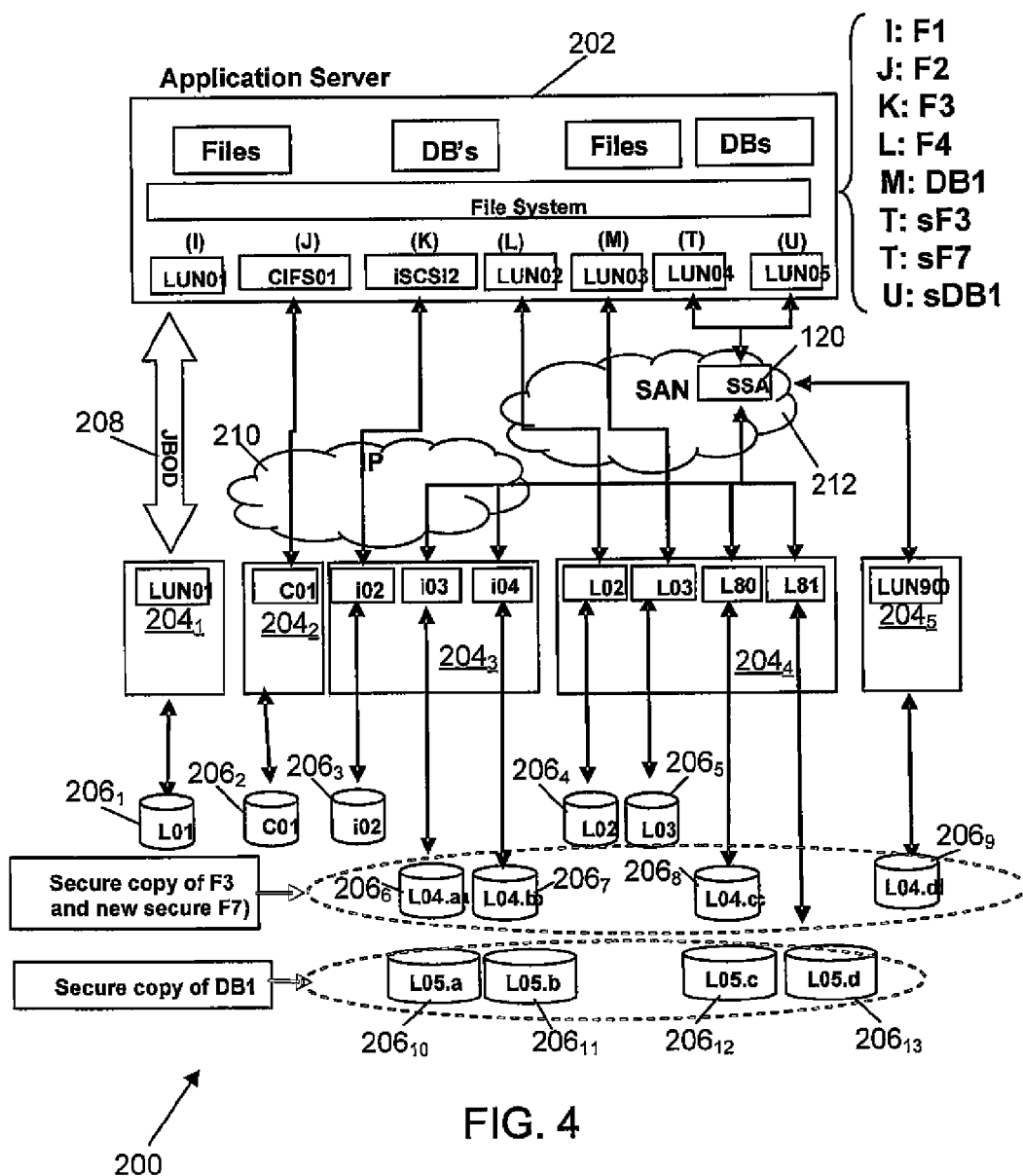
FIG. 4 illustrates a data storage system according to a further possible embodiment of the present disclosure.

Now referring to FIG. 4, a data storage system 200 is shown according to a possible embodiment of the present disclosure. The data storage system 200 provides additional security by way of introduction of a secure storage appliance and related infrastructure/functionality into the data storage system 200, as described in the generalized example of FIG. 3.

In the embodiment shown, the data storage system 200 includes an application server 202, upon which a number of files and databases are stored. The application server 202 is generally one or more computing devices capable of connecting to a communication network and providing data and/or application services to one or more users (e.g. in a client-server, thin client, or local account model). The application server 202 is connected to a plurality of storage systems 204. In the embodiment shown, storage systems $204_{1-5}$ are shown, and are illustrated as a variety of types of systems including direct local storage, as well as hosted remote storage. Each of storage systems 204 manages storage on one or more physical storage devices 206. The physical storage devices 206 generally correspond to hard disks or other long-term data storage devices. In the specific embodiment shown, the JBOD storage system $204_1$ connects to physical storage devices $206_1$, the NAS storage system $204_2$ connects to physical storage device $206_2$, the JBOD storage system $204_3$ connects to physical storage devices $206_{3-7}$, the storage system $204_4$ connects to physical storage devices $206_{8-12}$, and the JBOD storage system $204_5$ connects to physical storage device $206_{13}$. Other arrangements are possible as well, and are in general a matter of design choice.

In the embodiment shown, a plurality of different networks and communicative connections reside between the application server 202 and the storage systems 204. For example, the application server 202 is directly connected to JBOD storage system $204_1$ via a plurality of physical storage devices 208 (JBOD connection), e.g. for local storage. The application server 202 is also communicatively connected to storage systems $204_{2-3}$ via network 210, which uses any of a number of IP-based protocols such as Ethernet, WiFi, WiMax, Transfer Control Protocol, or any other of a number of communications protocols. The application server 202 also connects to storage systems $204_{4-5}$ via a storage area network (SAN) 212, which can be any of a number of types of SAN networks described in conjunction with SAN 125, above.

A secure storage appliance 120 is connected between the application server 202 and a plurality of the storage systems 204. The secure storage appliance 120 can connect to dedicated storage systems (e.g. the JBOD storage system $204_5$ in FIG. 4), or to storage systems connected both directly through the SAN 212, and via the secure storage appliance 120 (e.g. the JBOD storage system $204_3$ and storage system $204_4$). Additionally, the secure storage appliance 120 can connect to systems connected via the network 210 (e.g. the JBOD storage system $204_3$). Other arrangements are possible as well. In instances where the secure storage appliance 120 is connected to one of storage systems 204, one or more of the physical storage devices 206 managed by the corresponding system is secured by way of data processing by the secure storage appliance. In the embodiment shown, the physical storage devices $206_{3-7}$, $206_{10-13}$ are secured physical storage devices, meaning that these devices contain data managed by the secure storage appliance 120, as explained in further detail below.

Generally, inclusion of the secure storage appliance 120 within the data storage system 200 may provide improved data security for data stored on the physical storage devices. As is explained below, this can be accomplished, for example, by cryptographically splitting the data to be stored on the physical devices, such that generally each device contains only a portion of the data required to reconstruct the originally stored data, and that portion of the data is a block-level portion of the data encrypted to prevent reconstitution by unauthorized users.

Through use of the secure storage appliance 120 within the data storage system 200, a plurality of physical storage devices 208 can be mapped to a single volume, and that volume can be presented as a virtual disk for use by one or more groups of users. In comparing the example data storage system 200 to the prior art system shown in FIG. 1, it can be seen that the secure storage appliance 120 allows a user to have an arrangement other than one-to-one correspondence between drive volume letters (in FIG. 1, drive letters I-M) and physical storage devices. In the embodiment shown, two additional volumes are exposed to the application server 202, virtual disk drives T and U, in which secure copies of data can be stored. Virtual disk having volume label T is illustrated as containing secured volumes F3 and F7 (i.e. the drives mapped to the iSCSI2 port of the application server 202, as well as a new drive), thereby providing a secured copy of information on either of those drives for access by a group of users. Virtual disk having volume label U provides a secured copy of the data held in DB1 (i.e. the drive mapped to LUN03). By distributing volumes across multiple disks, security is enhanced because copying or stealing data from a single physical disk will generally be insufficient to access that data (i.e. multiple disks of data, as well as separately-held encryption keys, must be acquired)

Figure 5:
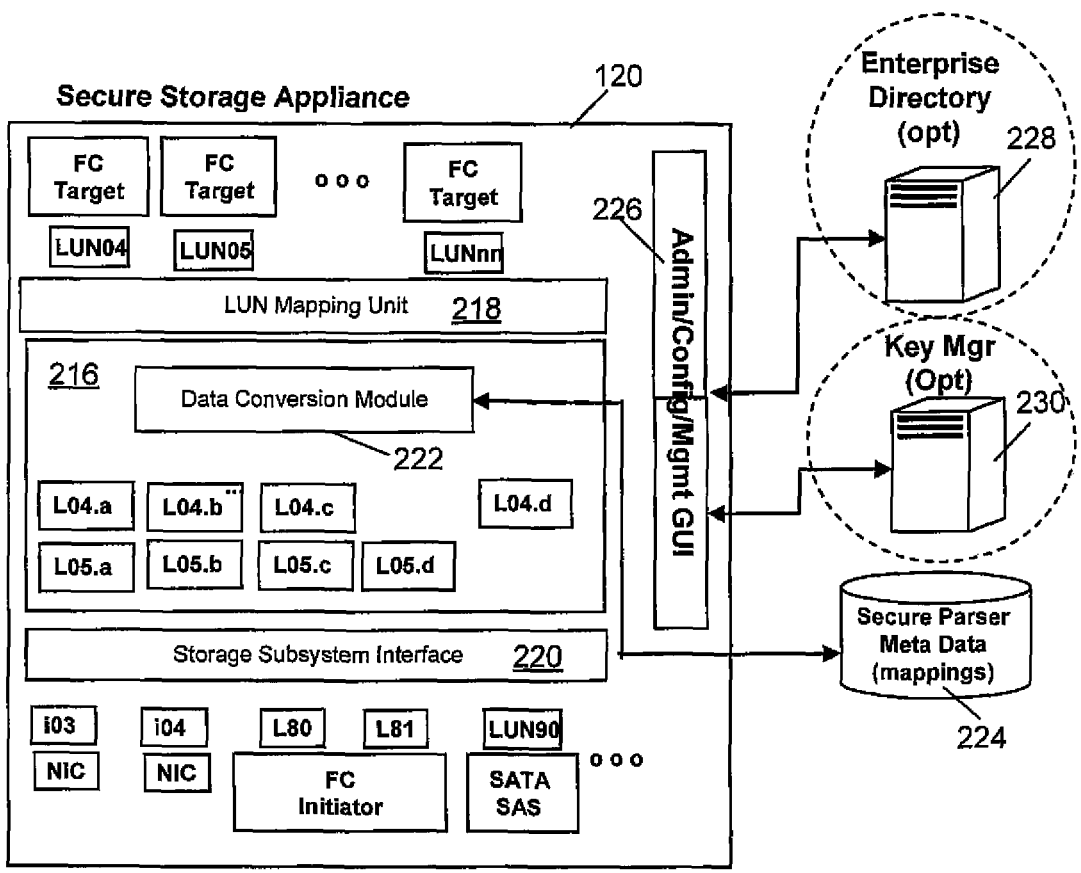
FIG. 5 illustrates a portion of a data storage system including a secure storage appliance, according to a possible embodiment of the present disclosure.

Referring now to FIG. 5, a portion of the data storage system 200 is shown, including details of the secure storage appliance 120. In the embodiment shown, the secure storage appliance 120 includes a number of functional modules that generally allow the secure storage appliance to map a number of physical disks to one or more separate, accessible volumes that can be made available to a client, and presenting a virtual disk to clients based on those defined volumes. Transparently to the user, the secure storage appliance applies a number of techniques to stored and retrieved data to provide data security.

In the embodiment shown, the secure storage appliance 120 includes a core functional unit 216, a LUN mapping unit 218, and a storage subsystem interface 220. The core functional unit 216 includes a data conversion module 222 that operates on data written to physical storage devices 206 and retrieved from the physical storage devices 206. In general, when the data conversion module 222 receives a logical unit of data (e.g. a file or directory) to be written to physical storage devices 206, it splits that primary data block at a physical level (i.e. a "block level") and encrypts the secondary data blocks using a number of encryption keys.

The manner of splitting the primary data block, and the number of physical blocks produced, is dictated by additional control logic within the core functional unit 216. As described in further detail below, during a write operation that writes a primary data block to physical storage (e.g. from an application server 202), the core functional unit 216 directs the data conversion module 222 to split the primary data block received from the application server 202 into N separate secondary data blocks. Each of the N secondary data blocks is intended to be written to a different one of physical storage devices 206 within the data storage system 200. The core functional unit 216 also dictates to the data conversion module 222 the number of shares (for example, denoted as M of the N total shares) that are required to reconstitute the primary data block when requested by the application server 202.

The secure storage appliance 120 connects to a metadata store 224, which is configured to hold metadata information about the locations, redundancy, and encryption of the data stored on the physical storage devices 206. The metadata store 224 is generally held locally or in proximity to the secure storage appliance 120, to ensure fast access of metadata regarding the shares. The metadata store 224 can be, in various embodiments, a database or file system storage of data describing the data connections, locations, and shares used by the secure storage appliance. Additional details regarding the specific metadata stored in the metadata store 224 are described below.

The LUN mapping unit 218 generally provides a mapping of one or more physical storage devices 206 to a volume. Each volume corresponds to a specific collection of physical storage devices 206 upon which the data received from client devices is stored. In contrast, typical prior art systems assign a LUN (logical unit number) or other identifier to each physical storage device or connection port to such a device, such that data read operations and data write operations directed to one of storage systems 204 can be performed specific to a device associated with the system. In the embodiment shown, the LUNs correspond to target addressable locations on the secure storage appliance 120, of which one or more is exposed to a client device, such as an application server 202. Based on the mapping of LUNs to a volume, the virtual disk related to that volume appears as a directly-addressable component of the data storage system 200, having its own LUN. From the perspective of the application server 202, this obscures the fact that primary data blocks written to a volume can in fact be split, encrypted, and written to a plurality of physical storage devices across one or more storage systems 204.

The storage subsystem interface 220 routes data from the core functional unit 216 to the storage systems 204 communicatively connected to the secure storage appliance 120. The storage subsystem interface 220 allows addressing various types of storage systems 204. Other functionality can be included as well.

In the embodiment shown, a plurality of LUNs are made available by the LUN mapping unit 218, for addressing by client devices. As shown by way of example, LUNs LUN04-LUNnn are illustrated as being addressable by client devices. Within the core functional unit 216, the data conversion module 222 associates data written to each LUN with a share of that data, split into N shares and encrypted. In the embodiment shown in the example of FIG. 5, a block read operation or block write operation to LUN04 is illustrated as being associated with a four-way write, in which secondary data blocks L04.a through L04.d are created, and mapped to various devices connected to output ports, shown in FIG. 5 as network interface cards (NICs), a Fibre Channel interface, and a serial ATA interface. An analogous operation is also shown with respect to LUN05, but written to a different combination of shares and corresponding physical disks.

The core functional unit 216, LUN mapping unit 218, and storage subsystem interface 220 can include additional functionality as well, for managing timing and efficiency of data read and write operations. Additional details regarding this functionality are described in another embodiment, detailed below in conjunction with the secure storage appliance functionality described in FIG. 6.

The secure storage appliance 120 includes an administration interface 226 that allows an administrator to set up components of the secure storage appliance 120 and to otherwise manage data encryption, splitting, and redundancy. The administration interface 226 handles initialization and discovery on the secure storage appliance, as well as creation, modifying, and deletion of individual volumes and virtual disks; event handling; data base administration; and other system services (such as logging). Additional details regarding usage of the administration interface 226 are described below in conjunction with FIG. 14.

In the embodiment shown of the secure storage appliance 120, the secure storage appliance 120 connects to an optional enterprise directory 228 and a key manager 230 via the administration interface 226. The enterprise directory 228 is generally a central repository for information about the state of the secure storage appliance 120, and can be used to help coordinate use of multiple secure storage appliances in a network, as illustrated in the configuration shown in FIG. 10, below. The enterprise directory 228 can store, in various embodiments, information including a remote user table, a virtual disk table, a metadata table, a device table, log and audit files, administrator accounts, and other secure storage appliance status information.

In embodiments lacking the enterprise directory 228, redundant secure storage appliances 214 can manage and prevent failures by storing status information of other secure storage appliances, to ensure that each appliance is aware of the current state of the other appliances.

The key manager 230 stores and manages certain keys used by the data storage system 200 for encrypting data specific to various physical storage locations and various individuals and groups accessing those devices. In certain embodiments, the key manager 230 stores workgroup keys. Each workgroup key relates to a specific community of individuals (i.e. a "community of interest") and a specific volume, thereby defining a virtual disk for that community. The key manager 230 can also store local copies of session keys for access by the secure storage appliance 120. Secure storage appliance 120 uses each of the session keys to locally encrypt data on different ones of physical storage devices 206. Passwords can be stored at the key manager 230 as well. In certain embodiments, the key manager 230 is operable on a computing system configured to execute any of a number of key management software packages, such as the Key Management Service provided for a Windows Server environment, manufactured by Microsoft Corp. of Redmond, Wash.

Although the present disclosure provides for encryption keys including session keys and workgroup keys, additional keys may be used as well, such as a disk signature key, security group key, client key, or other types of keys. Each of these keys can be stored on one or more of physical storage devices 206, at the secure storage appliance 120, or in the key manager 230.

Although FIGS. 4-5 illustrate a particular arrangement of a data storage system 200 for secure storage of data, additional arrangements are possible as well that can operate consistently with the concepts of the present disclosure. For example, in certain embodiments, the system can include a different number or type of storage systems or physical storage devices, and can include one or more different types of client systems in place of or in addition to the application server 202. Furthermore, the secure storage appliance 120 can be placed in any of a number of different types of networks, but does not require the presence of multiple types of networks as illustrated in the example of FIG. 4.

Figure 6:
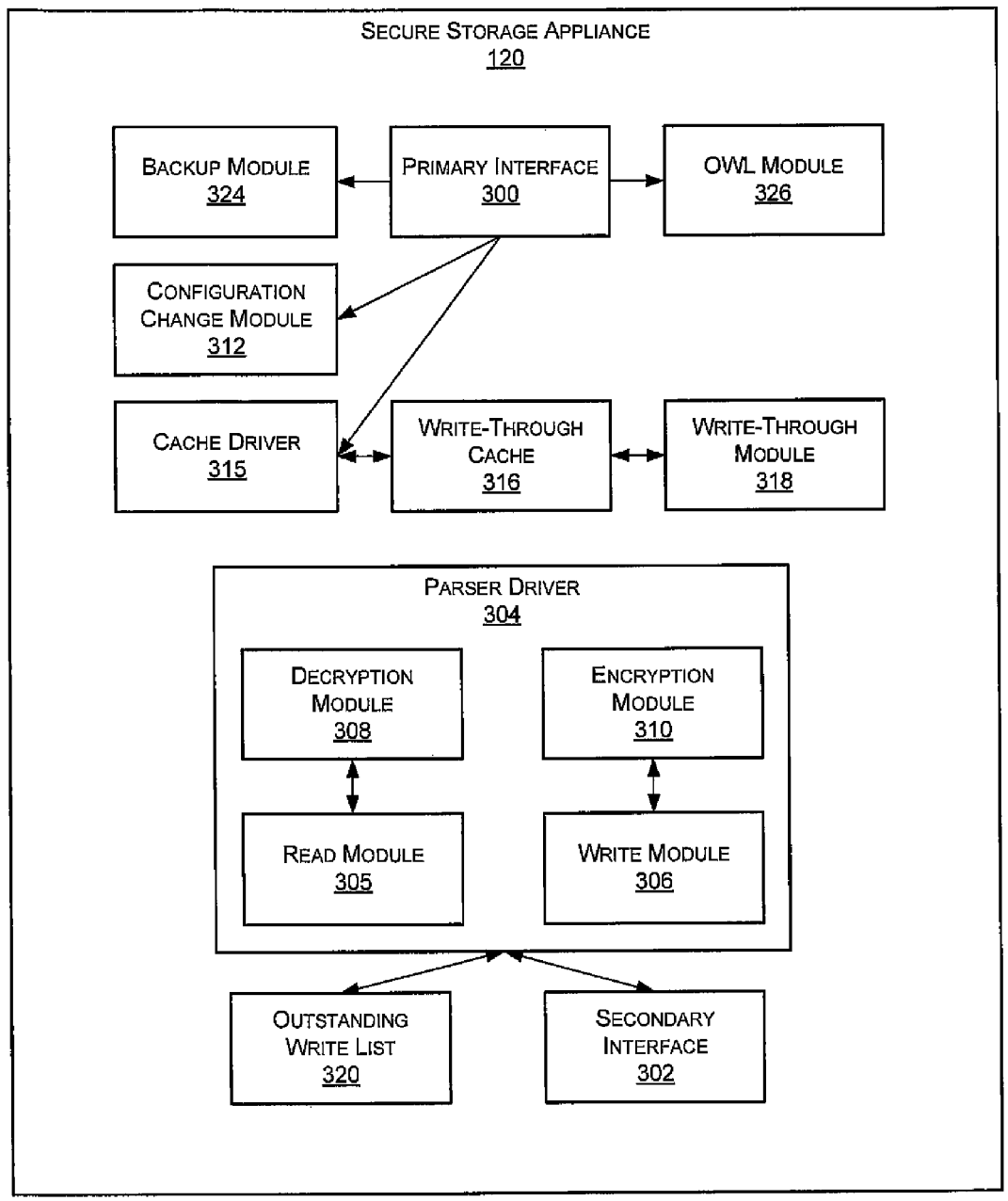
FIG. 6 illustrates a block diagram of logical components of a secure storage appliance, according to a possible embodiment of the present disclosure.

FIG. 6 is a block diagram that illustrates example logical components of the secure storage appliance 120. FIG. 6 represents only one example of the logical components of the secure storage appliance 120, for performing the operations described herein. The operations of the secure storage appliance 120 can be conceptualized and implemented in many different ways.

As illustrated in the example of FIG. 6, the secure storage appliance 120 comprises a primary interface 300 and a secondary interface 302. The primary interface 300 enables secure storage appliance 120 to receive primary I/O requests and to send primary I/O responses. For instance, the primary interface 300 can enable secure storage appliance 120 to receive primary I/O requests (e.g. read and write requests) from the application server device 202 and to send primary I/O responses to the application server 202. Secondary interface enables the secure storage appliance 120 to send secondary I/O requests to the storage systems 204, and to receive secondary I/O responses from those storage systems 204.

In addition, the secure storage appliance 120 comprises a parser driver 304. The parser driver 304 generally corresponds to the data conversion module 222 of FIG. 5, in that it processes primary I/O requests to generate secondary I/O requests and processes secondary I/O responses to generate primary I/O responses. To accomplish this, the parser driver 304 comprises a read module 305 that processes primary read requests to generate secondary read requests and processes secondary read responses to generate primary read responses. In addition, the parser driver 304 comprises a decryption module 308 that enables the read module 305 to reconstruct a primary data block using secondary blocks contained in secondary read responses. Example operations performed by the read module 305 are described below with reference to FIGS. 15, 22, and 24. Furthermore, the parser driver 304 comprises a write module 306 that processes primary write requests to generate secondary write requests and processes secondary write responses to generate primary write responses. The parser driver 304 also comprises an encryption module 310 that enables the write module 306 to cryptographically split primary data blocks in primary write requests into secondary data blocks to put in secondary write requests. An example operation performed by the write module 306 is described below as well with reference to FIGS. 16, 23, and 25.

In the example of FIG. 6, the secure storage appliance 120 also comprises a cache driver 315. When enabled, the cache driver 315 receives primary I/O requests received by the primary interface 300 before the primary I/O requests are received by parser driver 304. When the cache driver 315 receives a primary read request to read data at a primary storage location of a virtual disk, the cache driver 315 determines whether a write-through cache 316 at the secure storage appliance 120 contains a primary write request to write a primary data block to the primary storage location of the virtual disk. If the cache driver 315 determines that the write-through cache 316 contains a primary write request to write a primary data block to the primary storage location of the virtual disk, the cache driver 315 outputs a primary read response that contains the primary data block. When the parser driver 304 receives a primary write request to write a primary data block to a primary storage location of a virtual disk, the cache driver 315 caches the primary write request in the write-through cache 316. A write-through module 318 performs write operations to memory from the write-through cache 316.

The secure storage appliance 120 also includes an outstanding write list (OWL) module 326. When enabled, the OWL module 326 receives primary I/O requests from the primary interface 300 before the primary I/O requests are received by the parser driver 304. The OWL module 326 uses an outstanding write list 320 to process the primary I/O requests.

In addition, the secure storage appliance 120 comprises a backup module 324. The backup module 324 performs an operation that backs up data at the storage systems 204 to backup devices, as described below in conjunction with FIGS. 17-18.

The secure storage appliance 120 also comprises a configuration change module 312. The configuration change module 312 performs an operation that creates or destroys a volume, and sets its redundancy configuration. Example redundancy configurations (i.e. "M of N" configurations) are described throughout the present disclosure, and refer to the number of shares formed from a block of data, and the number of those shares required to reconstitute the block of data. Further discussion is provided with respect to possible redundancy configurations below, in conjunction with FIGS. 8-9.

It should be appreciated that many alternate implementations of the secure storage appliance 120 are possible. For example, a first alternate implementation of the secure storage appliance 120 can include the OWL module 326, but not the cache driver 315, or vice versa. In other examples, the secure storage appliance 120 might not include the backup module 324 or the configuration change module 312. Furthermore, there can be many alternate operations performed by the various modules of the secure storage appliance 120.

Figure 7:
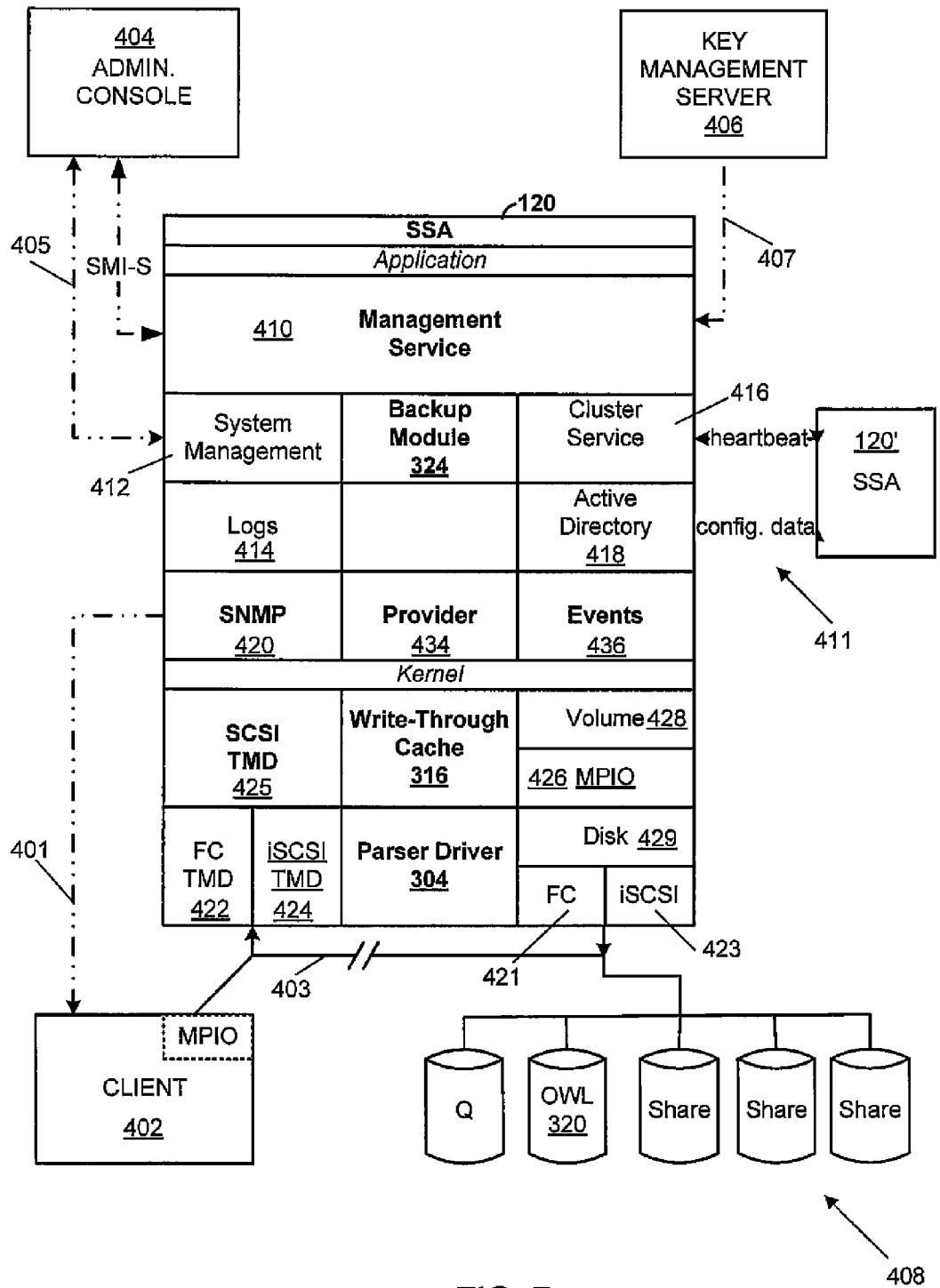
FIG. 7 illustrates a portion of a data storage system including a secure storage appliance, according to a further possible embodiment of the present disclosure.

FIG. 7 illustrates further details regarding connections to and operational hardware and software included in secure storage appliance 120, according to a possible embodiment of the present disclosure. The secure storage appliance 120 illustrates the various operational hardware modules available in the secure storage appliance to accomplish the data flow and software module operations described in FIGS. 4-6, above. In the embodiment shown, the secure storage appliance 120 is communicatively connected to a client device 402, an administrative console 404, a key management server 406, a plurality of storage devices 408, and an additional secure storage appliance 120'.

In the embodiment shown, the secure storage appliance 120 connects to the client device 402 via both an IP network connection 401 and a SAN network connection 403. The secure storage appliance 120 connects to the administrative console 404 by one or more IP connections 405 as well. The key management server 406 is also connected to the secure storage appliance 120 by an IP network connection 407. The storage devices 408 are connected to the secure storage appliance 120 by the SAN network connection 403, such as a Fibre Channel or other high-bandwidth data connection. Finally, in the embodiment shown, secure storage appliances 120 and 120' are connected via any of a number of types of communicative connections 411, such as an IP or other connection, for communicating heartbeat messages and status information for coordinating actions of the secure storage appliance 120 and the secure storage appliance 120'. Although in the embodiment shown, these specific connections and systems are included, the arrangement of devices connected to the secure storage appliance 120, as well as the types and numbers of devices connected to the appliance may be different in other embodiments.

The secure storage appliance 120 includes a number of software-based components, including a management service 410 and a system management module 412. The management service 410 and the system management module 412 each connect to the administrative console 404 or otherwise provide system management functionality for the secure storage appliance 120. The management service 410 and system management module 412 are generally used to set various settings in the secure storage appliance 120, view logs 414 stored on the appliance, and configure other aspects of a network including the secure storage appliance 120. Additionally, the management service 410 connects to the key management server 406, and can request and receive keys from the key management server 406 as needed.

A cluster service 416 provides synchronization of state information between the secure storage appliance 120 and secure storage appliance 120'. In certain embodiments, the cluster service 416 manages a heartbeat message and status information exchanged between the secure storage appliance 120 and the secure storage appliance 120'. Secure storage appliance 120 and secure storage appliance 120' periodically exchange heartbeat messages to ensure that secure storage appliance 120 and secure storage appliance 120' maintain contact. Secure storage appliance 120 and secure storage appliance 120' maintain contact to ensure that the state information received by each secure storage appliance indicating the state of the other secure storage appliance is up to date. An active directory services 418 stores the status information, and provides status information periodically to other secure storage appliances via the communicative connections 411.

Additional hardware and/or software components provide datapath functionality to the secure storage appliance 120 to allow receipt of data and storage of data at the storage devices 408. In the embodiment shown, the secure storage appliance 120 includes a SNMP connection module 420 that enables secure storage appliance 120 to communicate with client devices via the IP network connection 401, as well as one or more high-bandwidth data connection modules, such as a Fibre Channel input module 422 or SCSI input module 424 for receiving data from the client device 402 or storage devices 408. Analogous data output modules including a Fibre Channel connection module 421 or SCSI connection module 423 can connect to the storage devices 408 or client device 402 via the SAN network connection 403 for output of data.

Additional functional systems within the secure storage appliance 120 assist in datapath operations. A SCSI command module 425 parses and forms commands to be sent out or received from the client device 402 and storage devices 408. A multipath communications module 426 provides a generalized communications interface for the secure storage appliance 120, and a disk volume 428, disk 429, and cache 316 provide local data storage for the secure storage appliance 120.

Additional functional components can be included in the secure storage appliance 120 as well. In the embodiment shown, a parser driver 304 provides data splitting and encryption capabilities for the secure storage appliance 120, as previously explained. A provider 434 includes volume management information, for creation and destruction of volumes. An events module 436 generates and handles events based on observed occurrences at the secure storage appliance (e.g. data errors or communications errors with other systems).

FIGS. 8-9 provide a top level sense of a dataflow occurring during write and read operations, respectively, passing through a secure storage appliance, such as the secure storage appliance described above in conjunction with FIGS. 3-7. FIG. 8 illustrates a dataflow of a write operation according to a possible embodiment of the present disclosure, while FIG. 9 illustrates dataflow of a read operation. In the write operation of FIG. 8, a primary data block 450 is transmitted to a secure storage appliance (e.g. from a client device such as an application server). The secure storage appliance can include a functional block 460 to separate the primary data block into N secondary data blocks 470, shown as S-1 through S-N. In certain embodiments, the functional block 460 is included in a parser driver, such as parser driver 304, above. The specific number of secondary data blocks can vary in different networks, and can be defined by an administrative user having access to control settings relevant to the secure storage appliance. Each of the secondary data blocks 470 can be written to separate physical storage devices. In the read operation of FIG. 9, M secondary data blocks are accessed from physical storage devices, and provided to the functional block 460 (e.g. parser driver 304). The functional block 460 then performs an operation inverse to that illustrated in FIG. 8, thereby reconstituting the primary data block 450. The primary data block can then be provided to the requesting device (e.g. a client device).

In each of FIGS. 8-9, the N secondary data blocks 470 each represent a cryptographically split portion of the primary data block 450, such that the functional block 460 requires only M of the N secondary data blocks (where M<=N) to reconstitute the primary data block 450. The cryptographic splitting and data reconstitution of FIGS. 8-9 can be performed according to any of a number of techniques. In one embodiment, the parser driver 304 executes SecureParser software provided by Security First Corporation of Rancho Santa Margarita, Calif.

Although, in the embodiment shown in FIG. 9, the parser driver 304 uses the N secondary data blocks 470 to reconstitute the primary data block 450, it is understood that in certain applications, fewer than all of the N secondary data blocks 470 are required. For example, when the parser driver 304 generates N secondary data blocks during a write operation such that only M secondary data blocks are required to reconstitute the primary data block (where M<N), then data conversion module 60 only needs to read that subset of secondary data block from physical storage devices to reconstitute the primary data block 450.

For example, during operation of the parser driver 304 a data conversion routine may generate four secondary data blocks 470, of which two are needed to reconstitute a primary data block (i.e. M=2, N=4). In such an instance, two of the secondary data blocks 470 may be stored locally, and two of the secondary data blocks 470 may be stored remotely to ensure that, upon failure of a device or catastrophic event at one location, the primary data block 450 can be recovered by accessing one or both of the secondary data blocks 470 stored remotely. Other arrangements are possible as well, such as one in which four secondary data blocks 470 are stored locally and all are required to reconstitute the primary data block 450 (i.e. M=4, N=4). At its simplest, a single share could be created (M=N=1).

Figure 10:
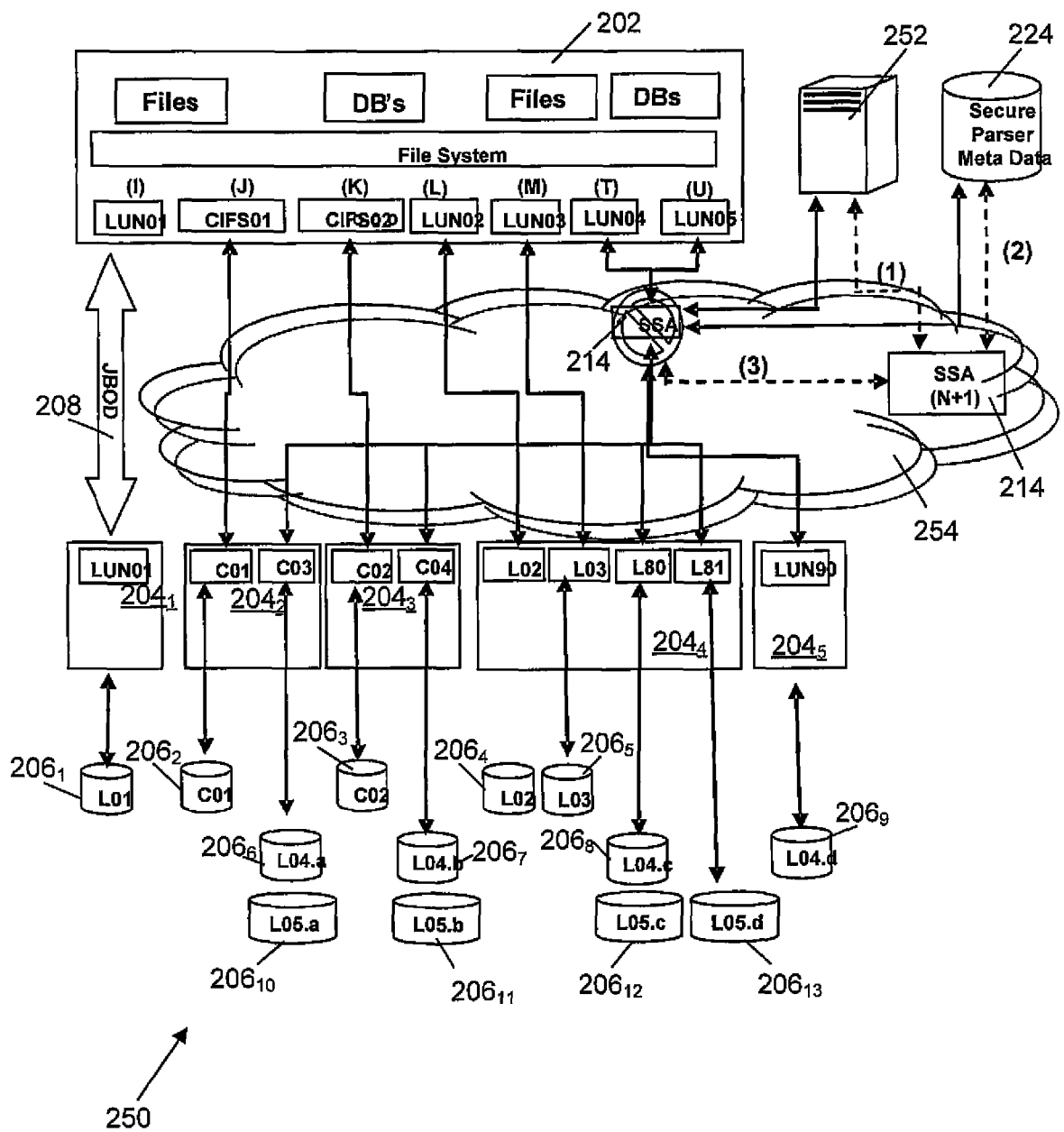
FIG. 10 illustrates a further possible embodiment of a data storage network including redundant secure storage appliances, according to a possible embodiment of the present disclosure.

FIG. 10 illustrates a further possible embodiment of a data storage system 250, according to a possible embodiment of the present disclosure. The data storage system 250 generally corresponds to the data storage system 200 of FIG. 4, above, but further includes redundant secure storage appliances 214. Each of secure storage appliances 214 may be an instance of secure storage appliance 120. Inclusion of redundant secure storage appliances 214 allows for load balancing of read and write requests in the data storage system 250, such that a single secure storage appliance is not required to process every secure primary read command or primary write command passed from the application server 202 to one of the secure storage appliances 214. Use of redundant secure storage appliances also allows for failsafe operation of the data storage system 250, by ensuring that requests made of a failed secure storage appliance are rerouted to alternative secure storage appliances.

In the embodiment of the data storage system 250 shown, two secure storage appliances 214 are shown. Each of the secure storage appliances 214 can be connected to any of a number of clients (e.g. the application server 202), as well as secured storage systems 204, the metadata store 224, and a remote server 252. In various embodiments, the remote server 252 could be, for example, an enterprise directory 228 and/or a key manager 230.

The secure storage appliances 214 are also typically connected to each other via a network connection. In the embodiment shown in the example of FIG. 10, the secure storage appliances 214 reside within a network 254. In various embodiments, network 254 can be, for example, an IP-based network, SAN as previously described in conjunction with FIGS. 4-5, or another type of network. In certain embodiments, the network 254 can include aspects of one or both types of networks. An example of a particular configuration of such a network is described below in conjunction with FIGS. 11-12.

The secure storage appliances 214 in the data storage system 250 are connected to each other across a TCP/IP portion of the network 254. This allows for the sharing of configuration data, and the monitoring of state, between the secure storage appliances 214. In certain embodiments there can be two IP-based networks, one for sharing of heartbeat information for resiliency, and a second for configuration and administrative use. The secure storage appliance 120 can also potentially be able to access the storage systems 204, including remote storage systems, across an IP network using a data interface.

In operation, sharing of configuration data, state data, and heartbeat information between the secure storage appliances 214 allows the secure storage appliances 214 to monitor and determine whether other secure storage appliances are present within the data storage system 250. Each of the secure storage appliances 214 can be assigned specific addresses of read operations and write operations to process. Secure storage appliances 214 can reroute received I/O commands to the appropriate one of the secure storage appliances 214 assigned that operation based upon the availability of that secure storage appliance and the resources available to the appliance. Furthermore, the secure storage appliances 214 can avoid addressing a common storage device 204 or application server 202 port at the same time, thereby avoiding conflicts. The secure storage appliances 214 also avoid reading from and writing to the same share concurrently to prevent the possibility of reading stale data.

When one of the secure storage appliances 214 fails, a second secure storage appliance can determine the state of the failed secure storage appliance based upon tracked configuration data (e.g. data tracked locally or stored at the remote server 252). The remaining operational one of the secure storage appliances 214 can also access information in the metadata store 224, including share and key information defining volumes, virtual disks and client access rights, to either process or reroute requests assigned to the failed device.

As previously described, the data storage system 250 is intended to be exemplary of a possible network in which aspects of the present disclosure can be implemented; other arrangements are possible as well, using different types of networks, systems, storage devices, and other components.

Figure 11:
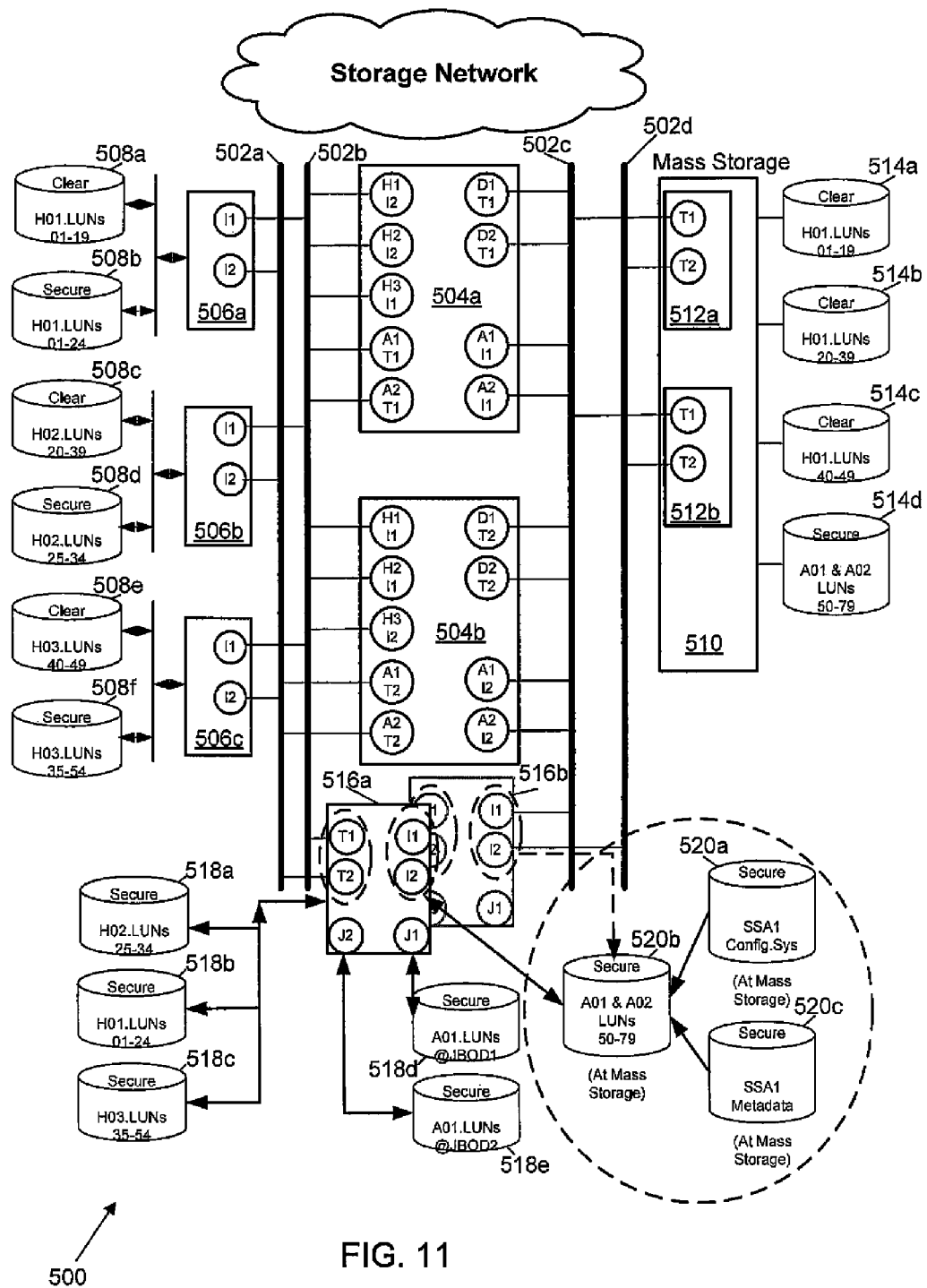
FIG. 11 illustrates incorporation of secure storage appliances in a portion of a data storage network, according to a possible embodiment of the present disclosure.

Referring now to FIG. 11, one possibility of a methodology of incorporating secure storage appliances into a data storage network, such as a SAN, is shown according to a possible embodiment of the present disclosure. In the embodiment shown, a secure storage network 500 provides for fully redundant storage, in that each of the storage systems connected at a client side of the network is replicated in mass storage, and each component of the network (switches, secure storage appliances) is located in a redundant array of systems, thereby providing a failsafe in case of component failure. In alternative embodiments, the secure storage network 500 can be simplified by including only a single switch and/or single secure storage appliance, thereby reducing the cost and complexity of the network (while coincidentally reducing the protection from component failure).

In the embodiment shown, an overall secure storage network 500 includes a plurality of data lines 502a-d interconnected by switches 504a-b. Data lines 502a-b connect to storage systems 506a-c, which connect to physical storage disks 508a-f. The storage systems 506a-c correspond generally to smaller-scale storage servers, such as an application server, client device, or other system as previously described. In the embodiment shown in the example of FIG. 11, storage system 506a connects to physical storage disks 508a-b, storage system 506b connects to physical storage disks 508c-d, and storage system 506c connects to physical storage disks 508e-f. The secure storage network 500 can be implemented in a number of different ways, such as through use of Fibre Channel or iSCSI communications as the data lines 502a-d, ports, and other data communications channels. Other high bandwidth communicative connections can be used as well.

The switches 504a-b connect to a large-scale storage system, such as the mass storage 510 via the data lines 502c-d. The mass storage 510 includes, in the embodiment shown, two data directors 512a-b, which respectively direct data storage and requests for data to one or more of the back end physical storage devices 514a-d. In the embodiment shown, the physical storage devices 514a-c are unsecured (i.e. not cryptographically split and encrypted), while the physical storage device 514d stores secure data (i.e. password secured or other arrangement).

The secure storage appliances 516a-b also connect to the data lines 502a-d, and each connect to the secure physical storage devices 518a-e. Additionally, the secure storage appliances 516a-b connect to the physical storage devices 520a-c, which can reside at a remote storage location (e.g. the location of the large-scale storage system mass storage 510).

In certain embodiments providing redundant storage locations, the secure storage network 500 allows a user to configure the secure storage appliances 516a-b such that, using the M of N cryptographic splitting enabled in each of the secure storage appliances 516a-b, M shares of data can be stored on physical storage devices at a local location to provide fast retrieval of data, while another M shares of data can be stored on remote physical storage devices at a remote location. Therefore, failure of one or more physical disks or secure storage appliances does not render data unrecoverable, because a sufficient number of shares of data remain accessible to at least one secure storage appliance capable of reconstituting requested data.

Figure 12:
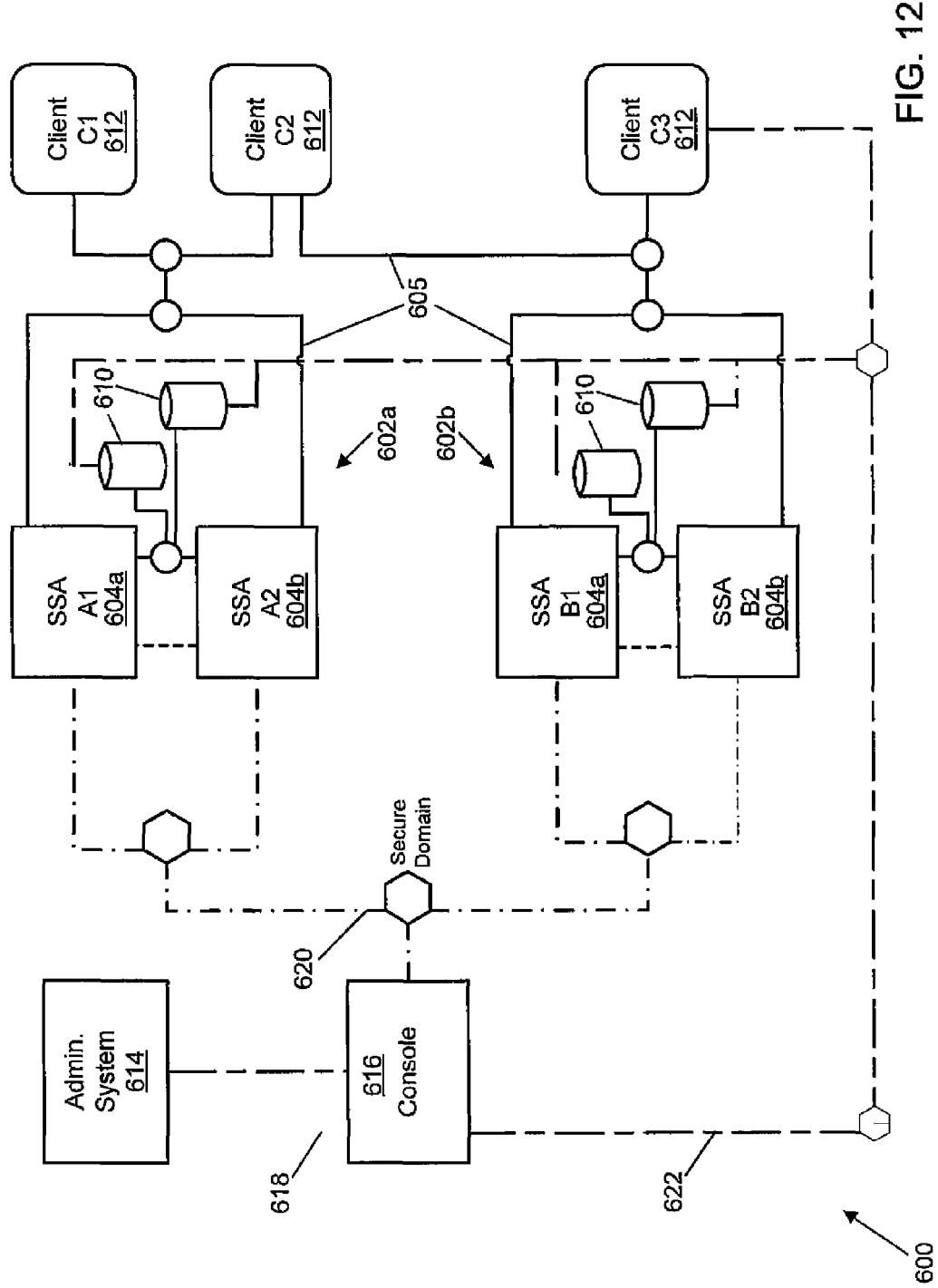
FIG. 12 illustrates an arrangement of a data storage network according to a possible embodiment of the present disclosure.

FIG. 12 illustrates a particular cluster-based arrangement of a data storage network 600 according to a possible embodiment of the present disclosure. The data storage network 600 is generally arranged such that clustered secure storage appliances access and store shares on clustered physical storage devices, thereby ensuring fast local storage and access to the cryptographically split data. The data storage network 600 is therefore a particular arrangement of the networks and systems described above in FIGS. 1-11, in that it represents an arrangement in which physical proximity of devices is accounted for.

In the embodiment shown, the data storage network 600 includes two clusters, 602a-b. Each of the clusters 602a-b includes a pair of secure storage appliances 604a-b, respectively. In the embodiment shown, the clusters 602a-b are labeled as clusters A and B, respectively, with each cluster including two secure storage appliances 604a-b (shown as appliances A1 and A2 in cluster 602a, and appliances B1 and B2 in cluster 602b, respectively). The secure storage appliances 604a-b within each of the clusters 602a-b are connected via a data network 605 (e.g. via switches or other data connections in an iSCSI, Fibre Channel, or other data network, as described above and indicated via the nodes and connecting lines shown within the data network 605) to a plurality of physical storage devices 610. Additionally, the secure storage appliances 604a-b are connected to client devices 612, shown as client devices C1-C3, via the data network 605. The client devices 612 can be any of a number of types of devices, such as application servers, database servers, or other types of data-storing and managing client devices.

In the embodiment shown, the client devices 612 are connected to the secure storage appliances 604a-b such that each of client devices 612 can send I/O operations (e.g. a read request or a write request) to two or more of the secure storage appliances 604a-b, to ensure a backup datapath in case of a connection failure to one of secure storage appliances 604a-b. Likewise, the secure storage appliances 604a-b of each of clusters 602a-b are both connected to a common set of physical storage devices 610. Although not shown in the example of FIG. 12, the physical storage devices 610 can be, in certain embodiments, managed by separate storage systems, as described above. Such storage systems are removed from the illustration of the data storage network 600 for simplicity, but can be present in practice.

An administrative system 614 connects to a maintenance console 616 via a local area network 618. Maintenance console 616 has access to a secured domain 620 of an IP-based network 622. The maintenance console 616 uses the secured domain 620 to access and configure the secure storage appliances 604a-b. One method of configuring the secure storage appliances is described below in conjunction with FIG. 14.

The maintenance console 616 is also connected to both the client devices 612 and the physical storage devices 610 via the IP-based network 622. The maintenance console 616 can determine the status of each of these devices to determine whether connectivity issues exist, or whether the device itself has become non-responsive.

Figure 13:
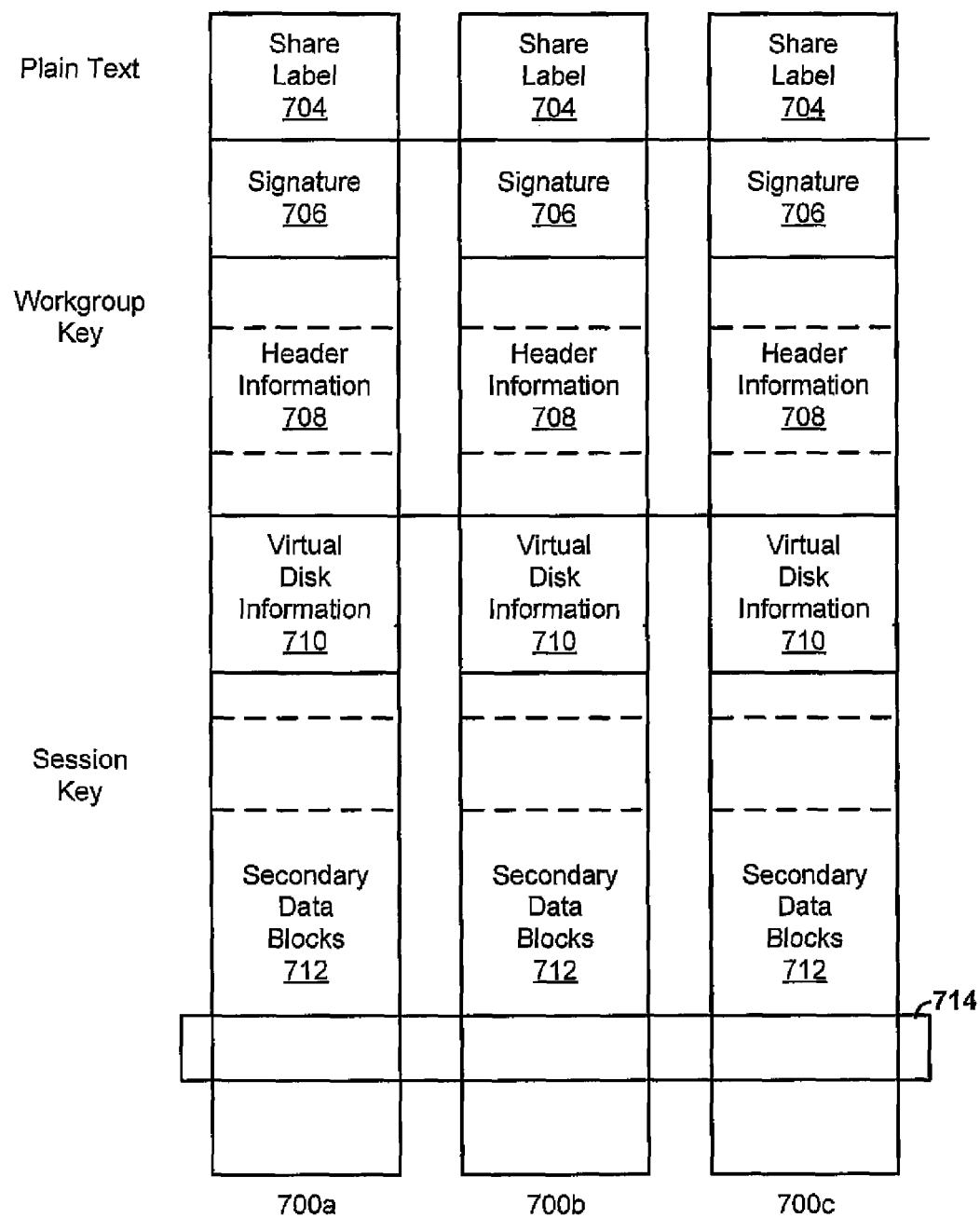
FIG. 13 illustrates a physical block structure of data to be written onto a physical storage device, according to aspects of the present disclosure.

Referring now to FIG. 13, an example physical block structure of data written onto one or more physical storage devices is shown, according to aspects of the present disclosure. The example of FIG. 13 illustrates three strips 700A, 700B, and 700C (collectively, "shares"). Each of strips 700 is a share of a physical storage device devoted to storing data associated with a common volume. For example, in a system in which a write operation splits a primary data block into three secondary data blocks (i.e. N=3), the strips 700 (shares) would be appropriately used to store each of the secondary data blocks. As used in this disclosure, a volume is grouped storage that is presented by a secure storage appliance to clients of secure storage appliance (e.g. secure storage appliance 120 or one of secure storage appliances 214 as previously described), such that the storage appears as a contiguous, unitary storage location. Secondary data blocks of a volume are distributed among strips 700. In systems implementing a different number of shares (e.g. N=2, 4, 6, etc.), a different, corresponding number of shares would be used. As basic as a 1 of 1 configuration (M=1, N=1) configuration could be used.

Each of the strips 700 corresponds to a reserved portion of memory of a different one of physical storage devices (e.g. physical storage devices 206 previously described), and relates to a particular I/O operation from storage or reading of data to/from the physical storage device. Typically, each of the strips 700 resides on a different one of physical storage devices. Furthermore, although three different strips are shown in the illustrative embodiment shown, more or fewer strips can be used as well. In certain embodiments, each of the strips 700 begins on a sector boundary. In other arrangements, the each of the strips 700 can begin at any other memory location convenient for management within the share.

Each of strips 700 includes a share label 704, a signature 706, header information 708, virtual disk information 710, and data blocks 712. The share label 704 is written on each of strips 700 in plain text, and identifies the volume and individual share. The share label 704 can also, in certain embodiments, contain information describing other header information for the strips 700, as well as the origin of the data written to the strip (e.g. the originating cluster).

The signature 706 contain information required to construct the volume, and is encrypted by a workgroup key. The signatures 706 contain information that can be used to identify the physical device upon which data (i.e. the share) is stored. The workgroup key corresponds to a key associated with a group of one or more users having a common set of usage rights with respect to data (i.e. all users within the group can have access to common data.) In various embodiments, the workgroup key can be assigned to a corporate department using common data, a common group of one or more users, or some other community of interest for whom common access rights are desired.

The header information 708 contains session keys used to encrypt and decrypt the volume information included in the virtual disk information 710, described below. The header information 708 is also encrypted by the workgroup key. In certain embodiments, the header information 708 includes headers per section of data. For example, the header information 708 may include one header for each 64 GB of data. In such embodiments, it may be advantageous to include at least one empty header location to allow re-keying of the data encrypted with a preexisting session key, using a new session key.

The virtual disk information 710 includes metadata that describes a virtual disk, as it is presented by a secure storage appliance. The virtual disk information 710, in certain embodiments, includes names to present the virtual disk, a volume security descriptor, and security group information. The virtual disk information 710 can be, in certain embodiments, encrypted by a session key associated with the physical storage device upon which the strips 700 are stored, respectively.

The secondary data blocks 712 correspond to a series of memory locations used to contain the cryptographically split and encrypted data. Each of the secondary data blocks 712 contains data created at a secure storage appliance, followed by metadata created by the secure storage appliance as well. The N secondary data blocks created from a primary data block are combined to form a stripe 714 of data. The metadata stored alongside each of the secondary data blocks 712 contains an indicator of the header used for encrypting the data. In one example implementation, each of the secondary data blocks 712 includes metadata that specifies a number of times that the secondary data block has been written. A volume identifier and stripe location of an primary data block an be stored as well.

It is noted that, although a session key is associated with a volume, multiple session keys can be used per volume. For example, a volume may include one session key per 64 GB block of data. In this example, each 64 GB block of data contains an identifier of the session key to use in decrypting that 64 GB block of data. The session keys used to encrypt data in each of strips 700 can be of any of a number of forms. In certain embodiments, the session keys use an AES-256 Counter with Bit Splitting. In other embodiments, it may be possible to perform bit splitting without encryption.

A variety of access request prioritization algorithms can be included for use with the volume, to allow access of only quickest-responding physical storage devices associated with the volume. Status information can be stored in association with a volume and/or share as well, with changes in status logged based on detection of event occurrences. The status log can be located in a reserved, dedication portion of memory of a volume. Other arrangements are possible as well.

It is noted that, based on the encryption of session keys with workgroup keys and the encryption of the secondary data blocks 712 in each of strips 700 with session keys, it is possible to effectively delete all of the data on a disk or volume (i.e. render the data useless) by deleting all workgroup keys that could decrypt a session key for that disk or volume.

Figure 14:
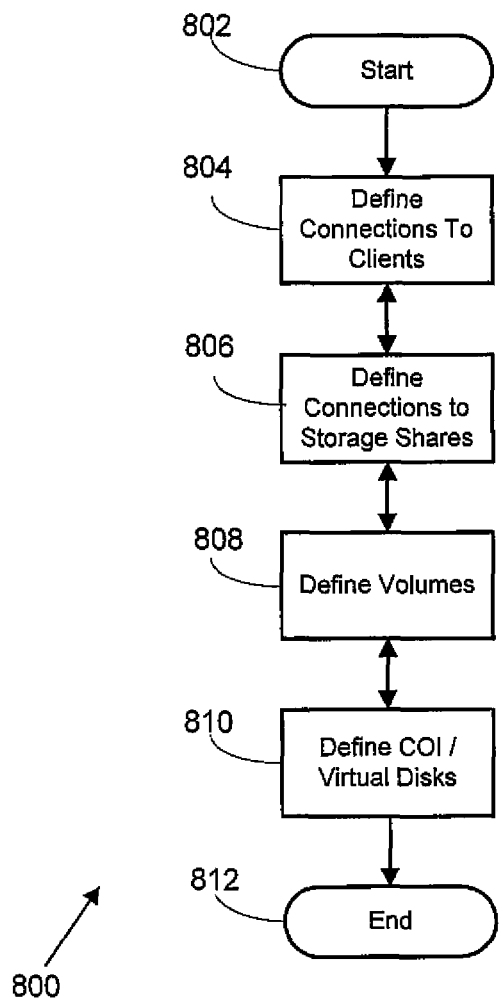
FIG. 14 shows a flowchart of systems and methods for providing access to secure storage in a storage area network according to a possible embodiment of the present disclosure.
Figure 15:
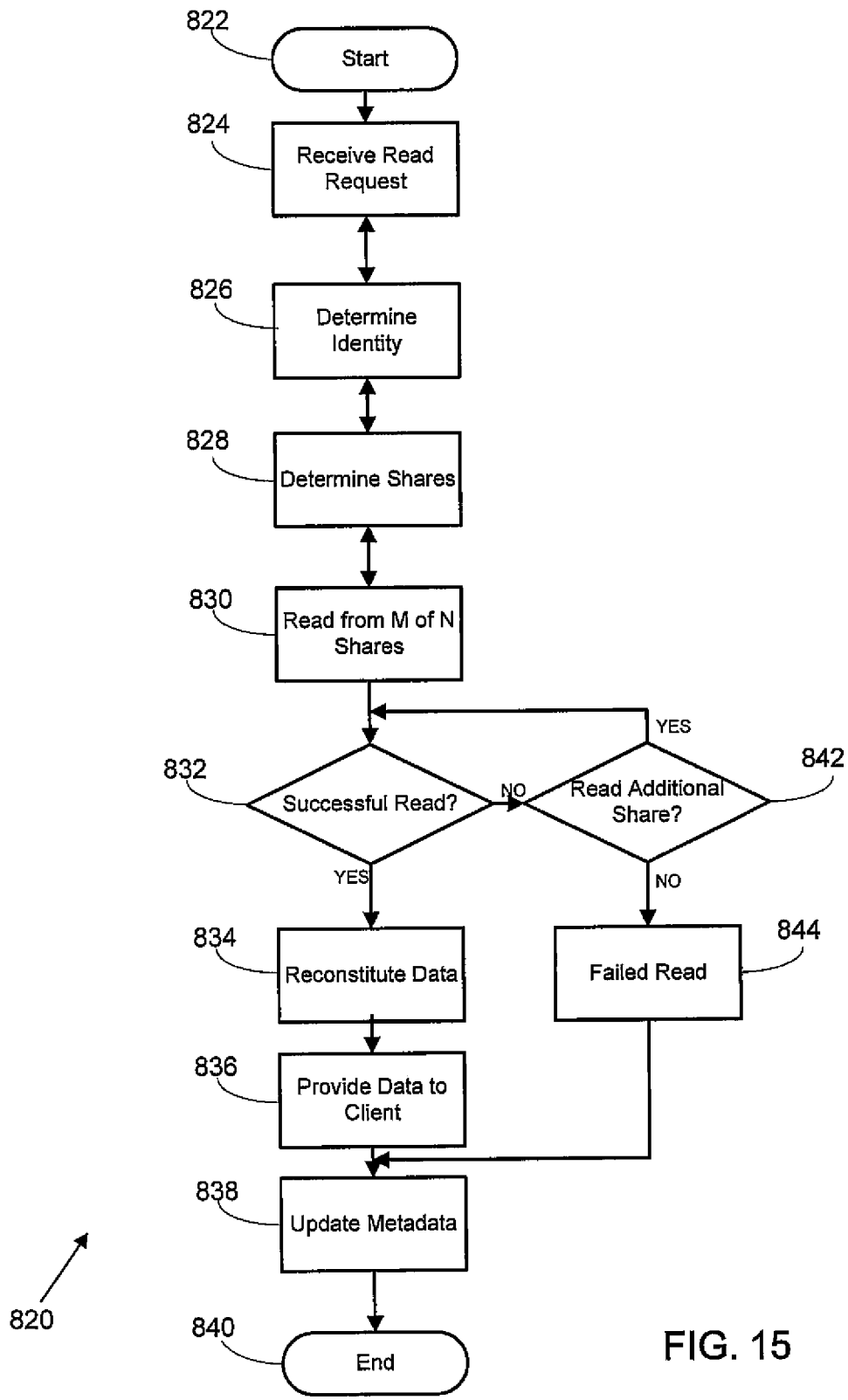
FIG. 15 shows a flowchart of systems and methods for reading block-level secured data according to a possible embodiment of the present disclosure.
Figure 16:
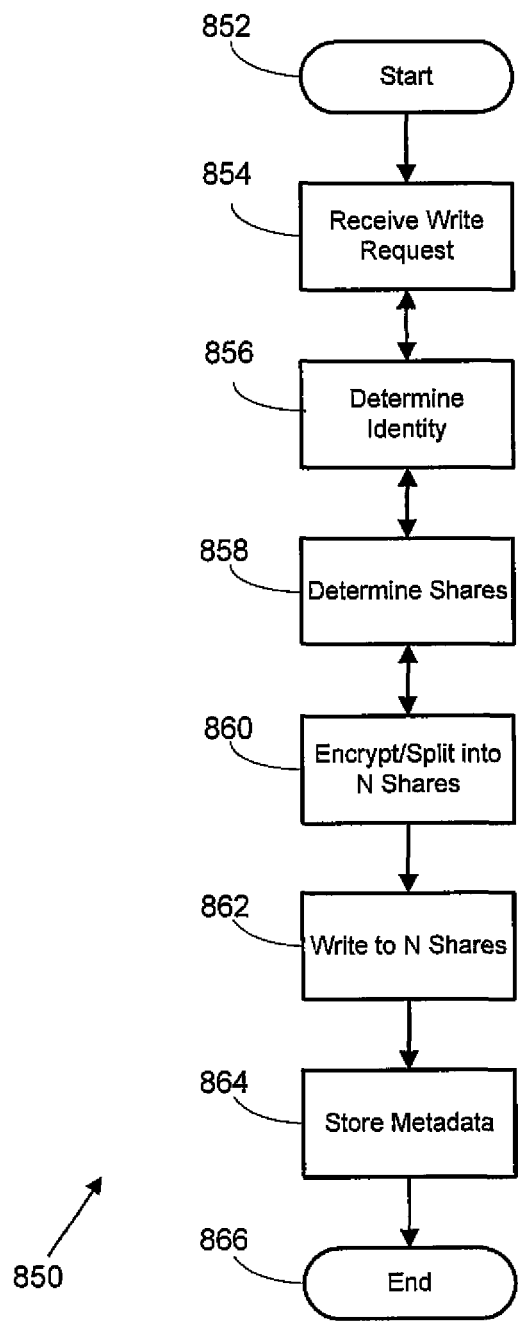
FIG. 16 shows a flowchart of systems and methods for writing block-level secured data according to a possible embodiment of the present disclosure.

Referring now to FIGS. 14-16, basic example flowcharts of setup and use of the networks and systems disclosed herein are described. Although these flowcharts are intended as example methods for administrative and I/O operations, such operations can include additional steps/modules, can be performed in a different order, and can be associated with different number and operation of modules. In certain embodiments, the various modules can be executed concurrently.

FIG. 14 shows a flowchart of systems and methods 800 for providing access to secure storage in a storage area network according to a possible embodiment of the present disclosure. The systems and methods 800 correspond to a setup arrangement for a network including a secure data storage system such as those described herein, including one or more secure storage appliances. The embodiments of the systems and methods described herein can be performed by an administrative user or administrative software associated with a secure storage appliance, as described herein.

Operational flow is instantiated at a start operation 802, which corresponds to initial introduction of a secure storage appliance into a network by an administrator or other individuals of such a network in a SAN, NAS, or other type of networked data storage environment. Operational flow proceeds to a client definition module 804 that defines connections to client devices (i.e. application servers or other front-end servers, clients, or other devices) from the secure storage appliance. For example, the client definition module 804 can correspond to mapping connections in a SAN or other network between a client such as application server 202 and a secure storage appliance 120 of FIG. 4.

Operational flow proceeds to a storage definition module 806. The storage definition module 806 allows an administrator to define connections to storage systems and related physical storage devices. For example, the storage definition module 806 can correspond to discovering ports and routes to storage systems 204 within the system 200 of FIG. 4, above.

Operational flow proceeds to a volume definition module 808. The volume definition module 808 defines available volumes by grouping physical storage into logical arrangements for storage of shares of data. For example, an administrator can create a volume, and assign a number of attributes to that volume. A storage volume consists of multiple shares or segments of storage from the same or different locations. The administrator can determine a number of shares into which data is cryptographically split, and the number of shares required to reconstitute that data. The administrator can then assign specific physical storage devices to the volume, such that each of the N shares is stored on particular devices. The volume definition module 808 can generate session keys for storing data on each of the physical storage devices, and store that information in a key server and/or on the physical storage devices. In certain embodiments, the session keys generated in the volume definition module 808 are stored both on a key server connected to the secure storage appliance and on the associated physical storage device (e.g. after being encrypted with an appropriate workgroup key generated by the communities of interest module 810, below). Optionally, the volume definition module 808 includes a capability of configuring preferences for which shares are first accessed upon receipt of a request to read data from those shares.

Operational flow proceeds to a communities of interest module 810. The communities of interest module 810 corresponds to creation of one or more groups of individuals having interest in data to be stored on a particular volume. The communities of interest module 810 module further corresponds to assigning of access rights and visibility to volumes to one or more of those groups.

In creating the groups via the communities of interest module 810, one or more workgroup keys may be created, with each community of interest being associated with one or more workgroup keys. The workgroup keys are used to encrypt access information (e.g. the session keys stored on volumes created during operation of the volume definition module 808) related to shares, to ensure that only individuals and devices from within the community of interest can view and access data associated with that group. Once the community of interest is created and associated with a volume, client devices identified as part of the community of interest can be provided with a virtual disk, which is presented to the client device as if it is a single, unitary volume upon which files can be stored.

In use, the virtual disks appear as physical disks to the client and support SCSI or other data storage commands. Each virtual disk is associated on a many-to-one basis with a volume, thereby allowing multiple communities of interest to view common data on a volume (e.g. by replicating the relevant session keys and encrypting those keys with relevant workgroup keys of the various communities of interest). A write command will cause the data to be encrypted and split among multiple shares of the volume before writing, while a read command will cause the data to be retrieved from the shares, combined, and decrypted.

Operational flow terminates at end operation 812, which corresponds to completion of the basic required setup tasks to allow usage of a secure data storage system.

FIG. 15 shows a flowchart of systems and methods 820 for reading block-level secured data according to a possible embodiment of the present disclosure. The systems and methods 820 correspond to a read or input command related to data stored via a secure storage appliance, such as those described herein. Operational flow in the system and methods 820 begins at a start operation 822. Operational flow proceeds to a receive read request module 824, which corresponds to receipt of a primary read request at a secure storage appliance from a client device (e.g. an application server or other client device, as illustrated in FIGS. 3-4). The read request generally includes an identifier of a virtual disk from which data is to be read, as well as an identifier of the requested data.

Operational flow proceeds to an identity determination module 826, which corresponds to a determination of the identity of the client from which the read request is received. The client's identity generally corresponds with a specific community of interest. This assumes that the client's identity for which the secure storage appliance will access a workgroup key associated with the virtual disk that is associated with the client.

Operational flow proceeds to a share determination module 828. The share determination module 828 determines which shares correspond with a volume that is accessed by way of the virtual disk presented to the user and with which the read request is associated. The shares correspond to at least a minimum number of shares needed to reconstitute the primary data block (i.e. at least M of the N shares). In operation, a read module 830 issues secondary read requests to the M shares, and receives in return the secondary data blocks stored on the associated physical storage devices.

A success operation 832 determines whether the read module 830 successfully read the secondary data blocks. The success operation may detect for example, that data has been corrupted, or that a physical storage device holding one of the M requested shares has failed, or other errors. If the read is successful, operational flow branches "yes" to a reconstitute data module 834. The reconstitute data module 834 decrypts a session key associated with each share with the workgroup key accessed by the identity determination module 826. The reconstitute data module 834 provides the session key and the encrypted and cryptographically split data to a data processing system within the secure storage appliance, which reconstitutes the requested data in the form of an unencrypted block of data physical disk locations in accordance with the principles described above in FIGS. 8-9 and 13. A provide data module 836 sends the reconstituted block of data to the requesting client device. A metadata update module 838 updates metadata associated with the shares, including, for example, access information related to the shares. From the metadata update module 838, operational flow proceeds to an end operation 840, signifying completion of the read request.

If the success operation 832 determines that not all of the M shares are successfully read, operational flow proceeds to a supplemental read operation 842, which determines whether an additional share exists from which to read data. If such a share exists (e.g. M<N), then the supplemental read operation reads that data, and operational flow returns to the success operation 832 to determine whether the system has now successfully read at least M shares and can reconstitute the primary data block as requested. If the supplemental read operation 842 determines that no further blocks of data are available to be read (e.g. M=N or M+failed reads>N), operational flow proceeds to a fail module 844, which returns a failed read response to the requesting client device. Operational flow proceeds to the metadata update module 838 and end operation 840, respectively, signifying completion of the read request.

Optionally, the fail module 844 can correspond to a failover event in which a backup copy of the data (e.g. a second N shares of data stored remotely from the first N shares) are accessed. In such an instance, once those shares are tested and failed, a fail message is sent to a client device.

In certain embodiments, commands and data blocks transmitted to the client device can be protected or encrypted, such as by using a public/private key or symmetric key encryption techniques, or by isolating the data channel between the secure storage appliance and client. Other possibilities exist for protecting data passing between the client and secure storage appliance as well.

Furthermore, although the system and methods 820 of FIG. 15 illustrates a basic read operation, it is understood that certain additional cases related to read errors, communications errors, or other anomalies may occur which can alter the flow of processing a read operation. For example, additional considerations may apply regarding which M of the N shares to read from upon initially accessing physical storage devices 206. Similar considerations apply with respect to subsequent secondary read requests to the physical storage devices in case those read requests fail as well.

FIG. 16 shows a flowchart of systems and methods 850 for writing block-level secured data according to a possible embodiment of the present disclosure. The systems and methods 850 as disclosed provide a basic example of a write operation, and similarly to the read operation of FIG. 15 additional cases and different operational flow may be used.

In the example systems and methods 850 disclosed, operational flow is instantiated at a start operation 852. Operational flow proceeds to a write request receipt module 854, which corresponds to receiving a primary write request from a client device (e.g. an application server as shown in FIGS. 3-4) at a secure storage appliance. The primary write request generally addresses a virtual disk, and includes a block of data to be written to the virtual disk.

Operational flow proceeds to an identity determination module 856, which determines the identity of the client device from which the primary write request is received. After determining the identity of the client device, the identity determination module 856 accesses a workgroup key based upon the identity of the client device and accesses the virtual disk at which the primary write request is targeted. Operational flow proceeds to a share determination module 858, which determines the number of secondary data blocks that will be created, and the specific physical disks on which those shares will be stored. The share determination module 858 obtains the session keys for each of the shares that are encrypted with the workgroup key obtained in the identity determination module 856 (e.g. locally, from a key manager, or from the physical disks themselves). These session keys for each share are decrypted using the workgroup key.

Operational flow proceeds to a data processing module 860, which provides to the parser driver 304 the share information, session keys, and the primary data block. The parser driver 304 operates to cryptographically split and encrypt the primary data block, thereby generating N secondary data blocks to be written to N shares in accordance with the principles described above in the examples of FIGS. 8-9 and 13. Operational flow proceeds to a secondary write module 862 which transmits the share information to the physical storage devices for storage.

Operational flow proceeds to a metadata storage module 864, which updates a metadata repository by logging the data written, allowing the secure storage appliance to track the physical disks upon which data has been written, and with what session and workgroup keys the data can be accessed. Operational flow terminates at an end operation 866, which signifies completion of the write request.

As previously mentioned, in certain instances additional operations can be included in the system and methods 850 for writing data using the secure storage appliance. For example, confirmation messages can be returned to the secure storage appliance confirming successful storage of data on the physical disks. Other operations are possible as well.

Figure 17:
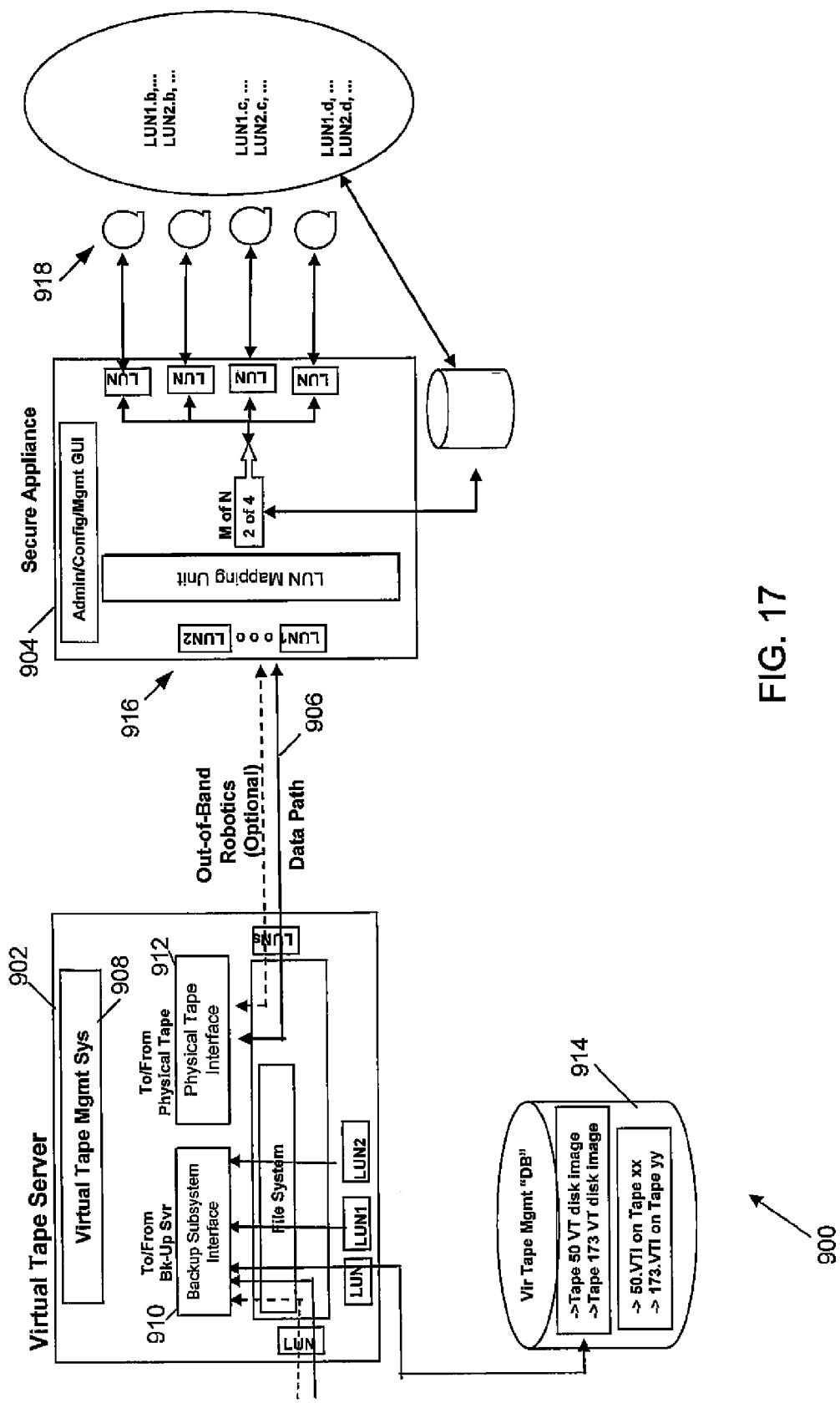
FIG. 17 shows a possible arrangement for providing secure storage data backup, according to a possible embodiment of the present disclosure.
Figure 18:
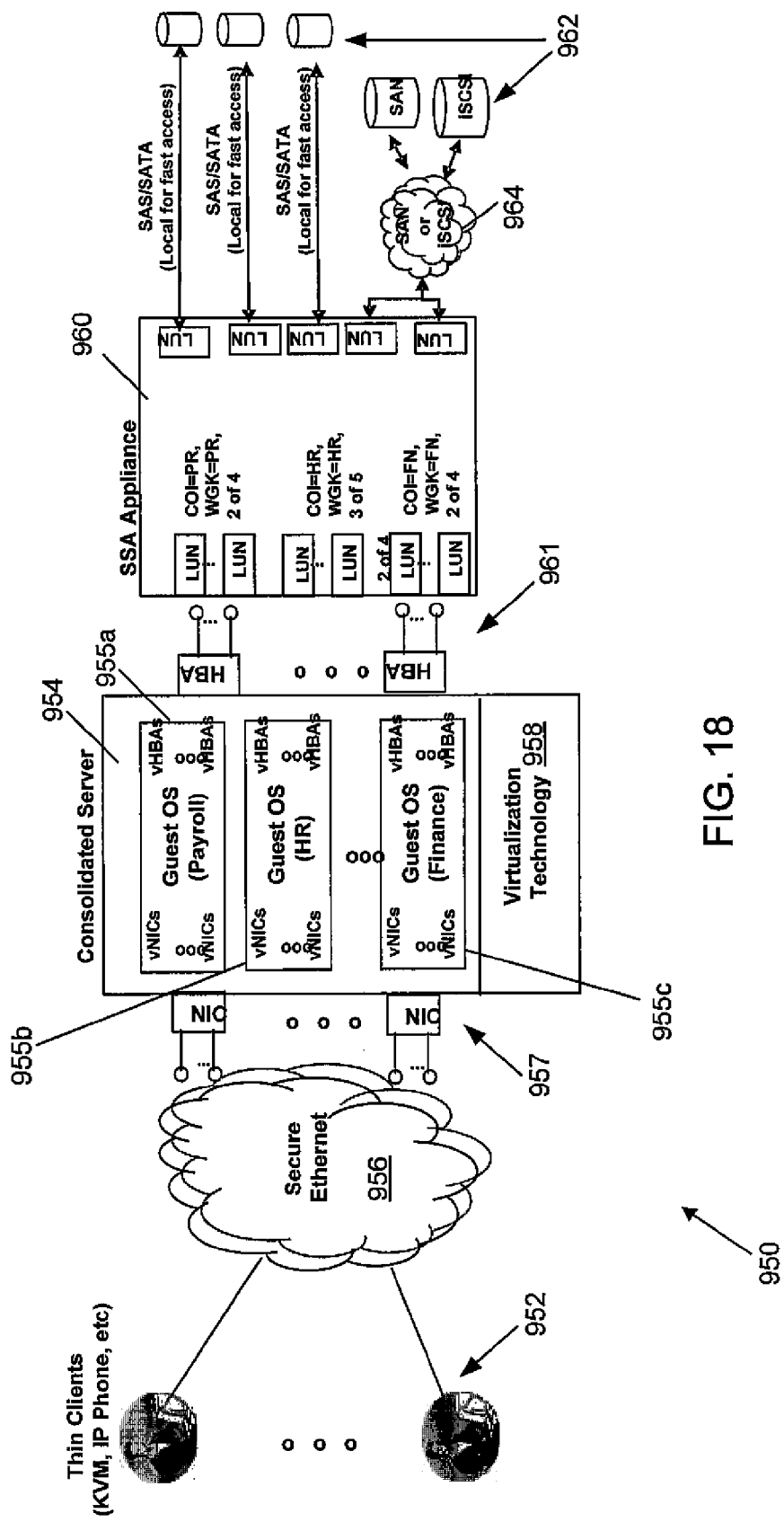
FIG. 18 shows a possible arrangement for providing secure storage for a thin client computing network, according to a possible embodiment of the present disclosure.

Now referring to FIGS. 17-18 of the present disclosure, certain applications of the present disclosure are discussed in the context of (1) data backup systems and (2) secure network thin client network topology used in the business setting. FIG. 17 shows an example system 900 for providing secure storage data backup, according to a possible embodiment of the present disclosure. In the system 900 shown, a virtual tape server 902 is connected to a secure storage appliance 904 via a data path 906, such as a SAN network using Fibre Channel or iSCSI communications. The virtual tape server 902 includes a management system 908, a backup subsystem interface 910, and a physical tape interface 912. The management system 908 provides an administrative interface for performing backup operations. The backup subsystem interface 910 receives data to be backed up onto tape, and logs backup operations. A physical tape interface 912 queues and coordinates transmission of data to be backed up to the secure storage appliance 904 via the network. The virtual tape server 902 is also connected to a virtual tape management database 914 that stores data regarding historical tape backup operations performed using the system 900.

The secure storage appliance 904 provides a virtual tape head assembly 916 which is analogous to a virtual disk but appears to the virtual tape server 902 to be a tape head assembly to be addressed and written to. The secure storage appliance 904 connects to a plurality of tape head devices 918 capable of writing to magnetic tape, such as that typically used for data backup. The secure storage appliance 904 is configured as described above. The virtual tape head assembly 916 provides an interface to address data to be backed up, which is then cryptographically split and encrypted by the secure storage appliance and stored onto a plurality of distributed magnetic tapes using the tape head devices 918 (as opposed to a generalized physical storage device, such as the storage devices of FIGS. 3-4).

In use, a network administrator could allocate virtual disks that would be presented to the virtual tape head assembly 916. The virtual tape administrator would allocate these disks for storage of data received from the client through the virtual tape server 902. As data is written to the disks, it would be cryptographically split and encrypted via the secure storage appliance 904.

The virtual tape administrator would present virtual tapes to a network (e.g. an IP or data network) from the virtual tape server 902. The data in storage on the tape head devices 918 is saved by the backup functions provided by the secure storage appliance 904. These tapes are mapped to the virtual tapes presented by the virtual tape head assembly 916. Information is saved on tapes as a collection of shares, as previously described.

An example of a tape backup configuration illustrates certain advantages of a virtual tape server over the standard tape backup system as described above in conjunction with FIG. 2. In one example of a tape backup configuration, share 1 of virtual disk A, share 1 of virtual disk B, and other share 1's can be saved to a tape using the tape head devices 918. Second shares of each of these virtual disks could be stored to a different tape. Keeping the shares of a virtual tape separate preserves the security of the information, by distributing that information across multiple tapes. This is because more than one tape is required to reconstitute data in the case of a data restoration. Data for a volume is restored by restoring the appropriate shares from the respective tapes. In certain embodiments an interface that can automatically restore the shares for a volume can be provided for the virtual tape assembly. Other advantages exist as well.

Now referring to FIG. 18, one possible arrangement of a thin client network topology is shown in which secure storage is provided. In the network 950 illustrated, a plurality of thin client devices 952 are connected to a consolidated application server 954 via a secured network connection 956.

The consolidated application server 954 provides application and data hosting capabilities for the thin client devices 952. In addition, the consolidated application server 954 can, as in the example embodiment shown, provide specific subsets of data, functionality, and connectivity for different groups of individuals within an organization. In the example embodiment shown, the consolidated application server 954 can connect to separate networks and can include separate, dedicated network connections for payroll, human resources, and finance departments. Other departments could have separate dedicated communication resources, data, and applications as well. The consolidated application server 954 also includes virtualization technology 958, which is configured to assist in managing separation of the various departments' data and application accessibility.

The secured network connection 956 is shown as a secure Ethernet connection using network interface cards 957 to provide network connectivity at the server 954. However, any of a number of secure data networks could be implemented as well.

The consolidated application server 954 is connected to a secure storage appliance 960 via a plurality of host bus adapter connections 961. The secure storage appliance 960 is generally arranged as previously described in FIGS. 3-16. The host bus adapter connections 961 allow connection via a SAN or other data network, such that each of the dedicated groups on the consolidated application server 954 has a dedicated data connection to the secure storage appliance 960, and separately maps to different port logical unit numbers (LUNs). The secure storage appliance 960 then maps to a plurality of physical storage devices 962 that are either directly connected to the secure storage appliance 960 or connected to the secure storage appliance 960 via a SAN 964 or other data network.

In the embodiment shown, the consolidated application server 954 hosts a plurality of guest operating systems 955, shown as guest operating systems 955*a-c*. The guest operating systems 955 host user-group-specific applications and data for each of the groups of individuals accessing the consolidated application server. Each of the guest operating systems 955*a-c* have virtual LUNs and virtual NIC addresses mapped to the LUNs and NIC addresses within the server 954, while virtualization technology 958 provides a register of the mappings of LUNS and NIC addresses of the server 954 to the virtual LUNs and virtual NIC addresses of the guest operating systems 955*a-c*. Through this arrangement, dedicated guest operating systems 955 can be mapped to dedicated LUN and NIC addresses, while having data that is isolated from that of other groups, but shared across common physical storage devices 962.

As illustrated in the example of FIG. 18, the physical storage devices 962 provide a typical logistical arrangement of storage, in which a few storage devices are local to the secure storage appliance, while a few of the other storage devices are remote from the secure storage appliance 960. Through use of (1) virtual disks that are presented to the various departments accessing the consolidated application server 954 and (2) shares of virtual disks assigned to local and remote storage, each department can have its own data securely stored across a plurality of locations with minimal hardware redundancy and improved security.

Although FIGS. 17-18 present a few options for applications of the secure storage appliance and secure network storage of data as described in the present disclosure, it is understood that further applications are possible as well. Furthermore, although each of these applications is described in conjunction with a particular network topology, it is understood that a variety of network topologies could be implemented to provide similar functionality, in a manner consistent with the principles described herein.

Now referring to FIGS. 19-22, certain aspects of the present disclosure are described in the context of failover such that data availability and data integrity are maintained despite failure of one or more computer network elements. The term "failover" as used herein refers to a failure recovery mechanism implemented in response to a removal of a redundant computer network element from functional operational service. In one aspect, failover can be in response to a voluntary action, such as for example an administrator taking a secure storage appliance off-line for maintenance. In most instances, failover in response to a voluntary action is not accompanied by potential issues relating to data availability and integrity. In contrast, an involuntary failover, such as in response to a spontaneous hardware or communication path failure, can potentially result in a compromise of data availability and/or security.

Figure 19:
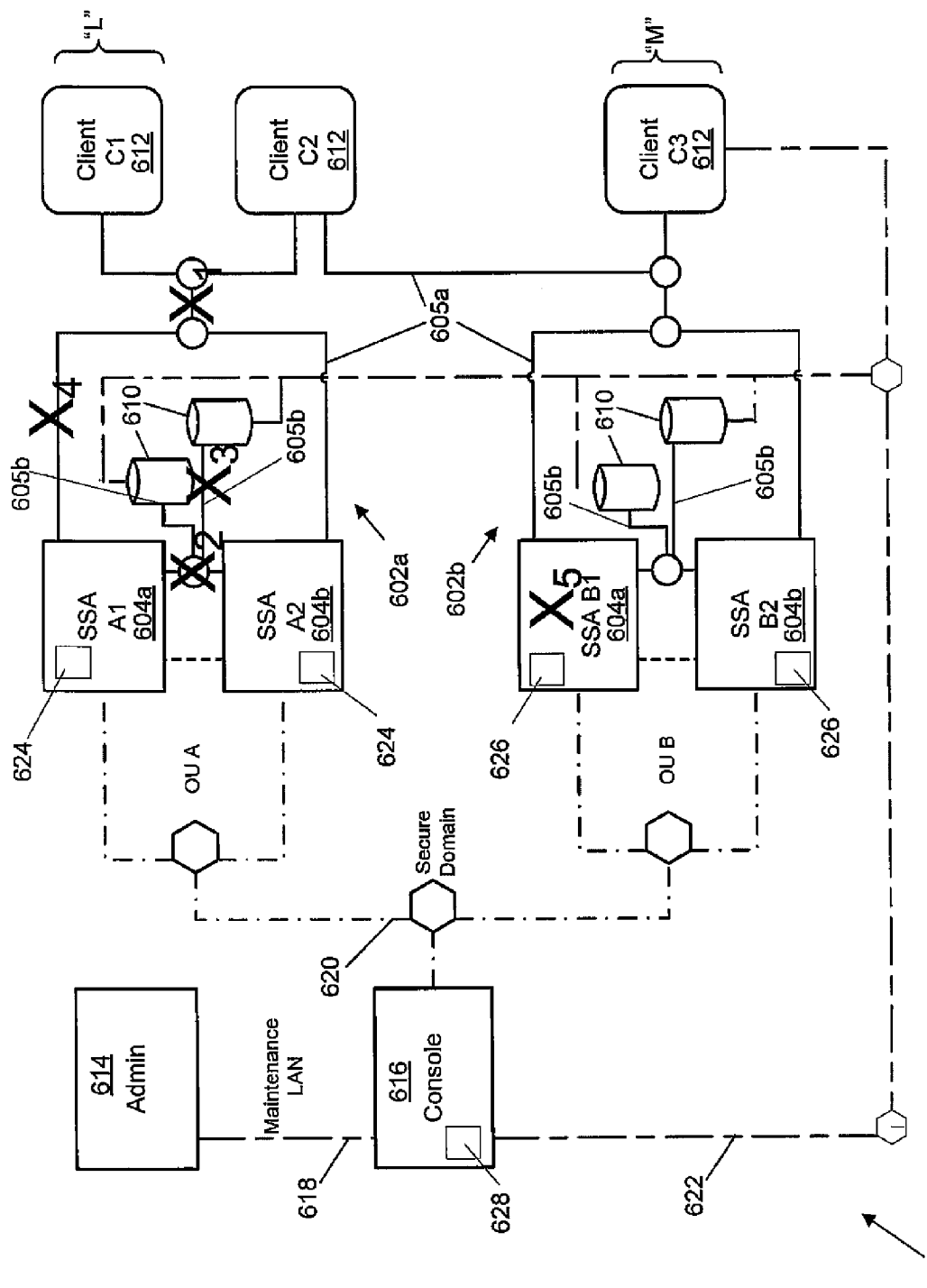
FIG. 19 illustrates the data storage network arrangement of FIG. 12 depicting a plurality of potential failover mechanism according to a possible embodiment of the present disclosure.

FIG. 19 depicts additional data storage network 600, as described above with reference to FIG. 12, to articulate failover and failover techniques according to the principles of the present disclosure. As described above, network 600 is only one example arrangement of a network and system in which one or more features and/or elements of the present disclosure may be implemented. Thus, it will be appreciated that the following description and example embodiments apply to a wide range of networks and systems configured accordingly. Particularly, to networks and systems in which a secure storage appliance provides, in part, a block-level cryptographic data splitting service.

As described above, network 600 is a cluster-based computer network arrangement in which two clusters, 602*a-b* are provided with a pair of secure storage appliances 604*a-b*, respectively. A data network 605, as previously described, can, as shown, include a front-end network 605*a* and a back-end network 605. A plurality of client devices 612 are connected to the clusters 602*a-b* via the data network 605, shown in FIG. 19 as front-end network 605*a*. Further, a common set of physical storage devices 610 are located within each cluster 604*a-b*, the storage devices 610 accessible to the pair of secure storage appliances 604*a-b* via the data network 605, shown in FIG. 19 as back-end network 605*b*. In general, each respective client device 612 can send an I/O operation associated with a volume (e.g., a read or write request) to at least one secure storage appliance 604 via front-end network 605*a* as desired. Subsequently, the I/O operation is executed by a respective secure storage appliances 604 via retrieval and/or storage of data on the common set of physical storage devices 610 over a back-end network 605*b*.

In the example embodiment, the front-end network 605*a* includes a plurality of I/O communication paths between secure storage appliances 604 and clients 612 in which each respective client 612 represents a valid I/O communication path to any secure storage appliance 604 in network 600. Each I/O communication path of front-end network 605*a* can configured so that only a properly configured client 612 can see and/or interpret the data that is transferred therethrough. Further, back-end network 605*b* includes a plurality of I/O communication paths arranged between a respective secure storage appliance 604 and one or more storage devices 610. Other configurations are possible as well.

Generally, the architecture and the various functional elements of network 600 introduce redundancy such that implementation of failover can occur between at least one of (1) a first cluster and a second cluster; and (2) a first secure storage appliance and a second secure storage appliance within a respective cluster. In this manner, I/O operation execution can proceed despite computer network element failure events while further maintaining data security. It will be appreciated that the level of redundancy is in general a matter of design choice.

In one example embodiment, in the context of element (1) above, cluster 602*a* and cluster 602*b* can be configured to be fully redundant such that in an event in which one of the respective clusters is rendered non-operational and/or portions of a respective cluster are inaccessible, failover to the remaining operational cluster can occur. For example, cluster 602*a* can be configured to operate as a localized primary cluster for client devices 612 to provide high-speed access to cryptographically split data stored on storage devices 610. In the example embodiment, cluster 602*b* can be configured to operate as a back-up to cluster 602*a*, in which the data stored on storage devices 610 in cluster 602*a* are periodically duplicated on storage devices 610 of back-up cluster 602*b*. In this manner, redundancy is provided such that an failure event related to cluster 602a would not render data stored on respective storage devices 610 inaccessible.

For example, one mechanism that can require failover from the primary cluster 602a to the back-up cluster 602b may include a communication path failure in front-end network 605a that would render secure storage appliances 604a-b of cluster 602a inaccessible. In the example embodiment, the described mechanism is designated by "$X_1$" overlaid on a portion of front-end network 605a. A second failover mechanism that can require the described failover may include a complete failure of I/O communications paths of back-end network 605b, such that data stored in storage elements 610 is rendered inaccessible to respective secure storage appliances 604a-b. In the example embodiment, this described failover mechanism is designated by "$X_2$" overlaid on a central node of back-end network 605b. Further, a third failover mechanism that can require the described failover may include a partial failure of I/O communications paths in back-end network 605b. In the example embodiment, failover would be required if requisite M of N shares (or equivalently, storage devices 610) are inaccessible and therefore an I/O operation cannot be executed, designated by "$X_3$" overlaid on a portion of back-end network 605b.

In general, upon detection of the example failure mechanisms represented by scenarios $X_1$, $X_2$, and $X_3$, an assessment of the failure can be made and I/O messages can be rerouted to backup cluster 602b for processing, described in further detail below with reference to FIGS. 20-22. In certain embodiments, cluster 602b can be remotely located with respect to cluster 602a to provide an additional level of protection.

In one example embodiment, in the context of element (2) above, failover from a first secure storage appliance to a second secure storage appliance within a respective cluster is provided. In one example embodiment, a failure event that can initiate failover from a first secure storage appliance to a second secure storage appliance may include a failure of an I/O communication path between a secure storage appliance configured as a primary secure storage appliance and a respective client. In general, a secure storage appliance is configured as a primary secure storage appliance by assigning a volume to a respective secure storage appliance, the respective secure storage appliance selected from among a plurality of secure storage appliances. In the example embodiment, the volume is presented as a virtual disk to a client device and mapped to physical storage at each of a plurality of storage systems.

For example, secure storage appliance 604a in cluster 602a can be configured as a primary secure storage appliance for a virtual disk "L" as presented to client C1 612. In the event that a physical communication path between secure storage appliance 604a and client C1 612 fail (designated by "$X_4$" overlaid on portion of front-end network 605a), failover to secure storage appliance 604b can occur, thereby rendering secure storage appliance 604b as a new primary secure storage appliance for virtual disk "L".

An alternate example failure event that can initiate failover from a primary secure storage appliance to a secondary secure storage appliance may include the failure of a primary secure storage appliance. For example, in an example application, the secure storage appliance 604a in cluster 602b can be configured as a primary secure storage appliance for virtual disk "M" presented to client C3 612. In the example, upon detecting at one of a plurality of secure storage appliances a failure of the primary secure storage appliance (designated by "$X_5$" overlaid on secure storage appliance 604a in cluster 602b) failover to secure storage appliance 604b can occur, thereby rendering secure storage appliance 604b as a new primary secure storage appliance for virtual disk "M".

In general, upon detection of the example failure mechanisms represented by scenarios $X_4$ and $X_5$, an assessment of the failure can initially be made, and upon a determination to proceed with failover, a volume can be reassigned to a secondary secure storage appliance, thereby rendering the second secure storage appliance a new primary storage appliance, as described in further detail below with reference to FIGS. 20-22.

In the example embodiments, the clustered configuration and secure storage appliances of network 600 enables failover to occur such that block level I/O message processing on an individual virtual disk basis remains uninterrupted and uncorrupted. In general, coordination among respective secure storage appliances is enabled via a plurality of administrative settings stored in a configuration database required to facilitate failover and restoration in a wide variety of failure scenarios. In example embodiments, the administrative settings provide each respective secure storage appliance with network configuration information, such as configuration of primary and secondary secure storage appliance. For example, in one embodiment, each respective cluster 602a-b may be provided with a configuration database, 624 and 626, respectively. In the example embodiment, the respective configuration databases 624, 626 are duplicated between all secure storage appliances within a respective cluster 602a-b. In an example application in which data stored within storage device 610 is duplicated between respective clusters 602a-b, configuration databases 624, 626 would be equivalent, as described in further detail below. In this manner, if any one secure storage appliance is off-line, the remaining online secure storage appliances can continue operation with a local copy of the configuration database. Further, when the off-line secure storage appliance becomes available, its configuration database can be restored either via a download from another secure storage appliance in the respective cluster, or from administrator device (e.g., console 616) storing an equivalent database, as described below.

In certain embodiments, a database service can provide a repository for configuration information, such as Active Directory provided for a Windows Server environment, manufactured by Microsoft Corp. of Redmond, Wash.

The administrative settings can be configured by an administrator 614 via an administrative interface 628 on console 616. In certain embodiments, the administrative interface further presents the respective secure storage appliances arranged in cluster 602a-b as a virtual secure storage appliance, such that the configuration of the each respective primary and secondary secure storage appliance is transparent. Further, the administrative settings can be associated with the virtual secure storage appliance such that upon a failure of a secure storage appliance, the common set of settings remain accessible to the administrator.

Figure 20:
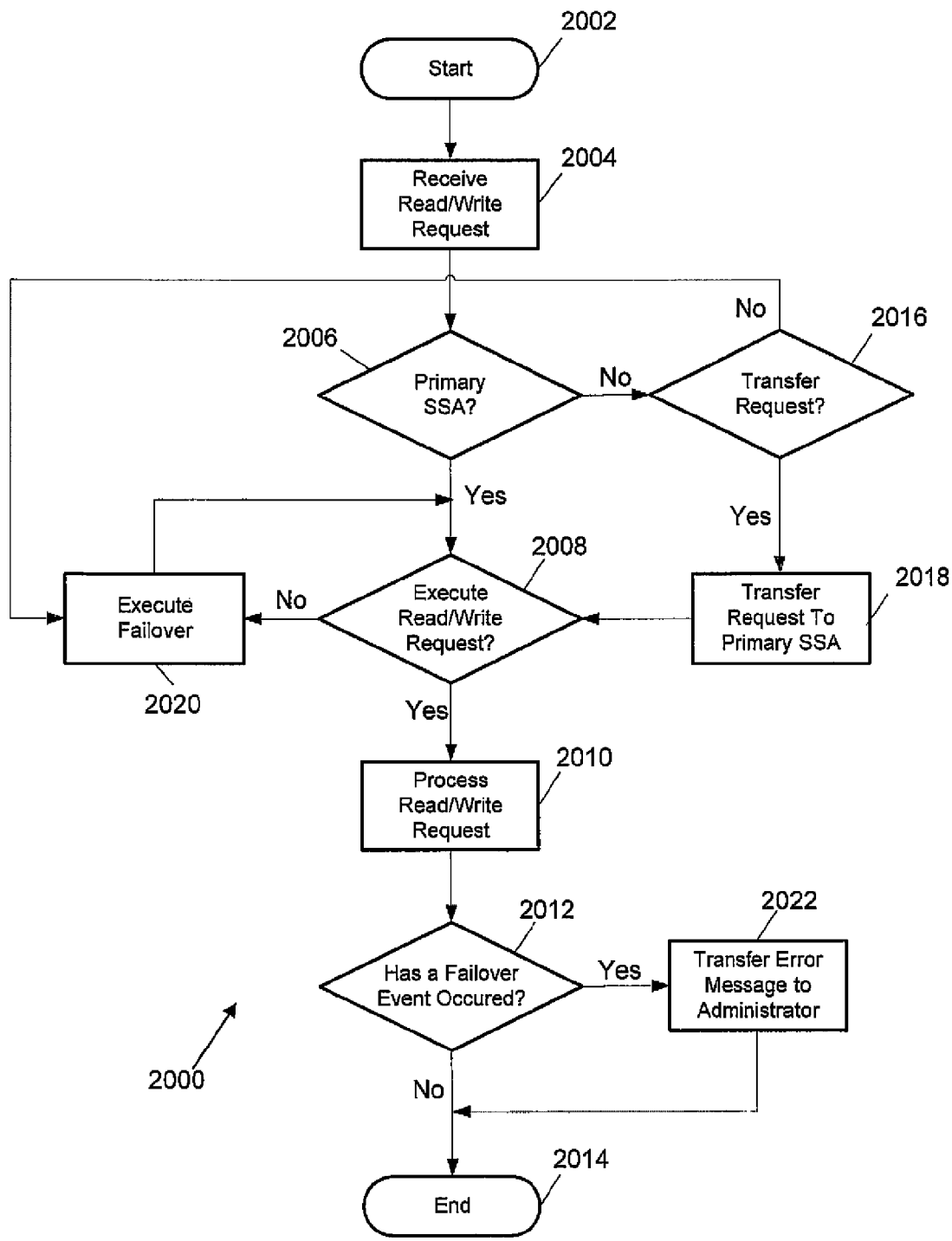
FIG. 20 shows a flowchart of systems and methods for failover according to a possible embodiment of the present disclosure.

Referring now to FIG. 20, systems and methods 2000 for implementing a basic failover between a primary secure storage appliance and a secondary secure storage appliance in a multi-path computer network is provided according to principles of the present disclosure. In general, the example failover as described maintains data connectivity in a secure storage network. In certain embodiments, the multi-path computer network is a clustered computer network as described with reference to FIGS. 12 and 19. In this manner, failover can generally occur between secure storage appliances located in separate clusters or between secure storage appliances located within similar cluster. Further, the secure storage appliance of the disclosed systems and methods 2000 provide a block-level cryptographic data splitting service as described in part with reference to FIGS. 8-9, 15-16 and further throughout the present disclosure.

In the example systems and methods 2000 disclosed, operational flow is instantiated at a start operation 2002. In one embodiment, start operation 2002 corresponds to a one or more elements of the multi-path computer network coming on-line, such as for example the primary and secondary secure storage appliance and a plurality of further respective secure storage appliances, storage devices, client devices, and administrator device.

In one example embodiment, the primary secure storage appliance is configured by an administrator via an administrative interface (e.g., as would have been hosted on administrator device 614 of FIGS. 12 and 19) as the primary appliance by assigning a volume to the primary secure storage appliance, the volume being presented as a virtual disk to a respective client device and mapped to physical storage at one or more storage devices. Further, in the example embodiment, the secondary secure storage appliance can be configured by the administrator as the secondary. In certain embodiments, the administrative interface presents the primary, secondary, and remaining plurality of secure storage appliances as a virtual secure storage appliance such that each respective secure storage appliance can be dynamically configured.

Operational flow proceeds to a receive read/write request module 2004. Receive read/write request module 2004 corresponds to receipt a block level I/O message associated with a specific volume (the I/O message consisting of one of a read request and a write request) from a respective client device (e.g. an application server as shown in FIGS. 3-4). The receive read/write request module 2004 can operate, in certain embodiments, on a secure storage appliance within a computer network, as described above.

Operational flow proceeds to a determination module 2006. In one aspect, determination module 2006 corresponds to identifying the client device from which the block level I/O message is received and making a determination if the secure storage appliance receiving the data request is the assigned primary secure storage appliance for the respective volume associated with the block level I/O message. In one embodiment, the determination is made by accessing a local copy of a configuration database in which a plurality of common network administrative settings of the plurality of secure storage appliances associated with a virtual secure storage appliance are defined on an individual virtual disk basis, including settings related to primary and secondary secure storage appliance configuration.

Upon a positive determination at determination module 2006, indicating that the block level I/O message was received by the primary secure storage appliance, operational flow branches "Yes" and proceeds to an execute request evaluation module 2008. Execute request evaluation module 2008 in one aspect corresponds to receiving, at a primary secure storage appliance, the block level I/O message as transferred from a transfer request module 2018. In a second aspect, operational flow to request evaluation module 2008 occurs via a positive determination at determination module 2006, as described above. In one embodiment, request evaluation module 2008 corresponds to a determination if the block level I/O message can be successfully executed. In one aspect, the determination is made via an assessment of the operational status of a plurality of elements in the network. For example, an evaluation of the operational status of a plurality of relevant I/O communication paths in the network can be made, described in further detail with respect to FIGS. 21-22.

Returning now to determination module 2006, upon a negative determination at the determination module 2006, indicating that the block level I/O message was received by a secondary secure storage appliance, operational flow branches "No" and proceeds to a transfer evaluation module 2016. Transfer evaluation module 2016 corresponds to a determination if the secondary secure storage appliance should transfer the block I/O message to the identified primary secure storage appliance. In certain embodiments, transfer evaluation module 2016 determines if the receipt of a block I/O message for the identified primary secure storage appliance is a reoccurring event, thereby suggesting the primary storage device is offline or unable to process the block I/O message. Other evaluations are possible as well.

Upon a positive determination at transfer evaluation module 2016, indicating a decision to transfer the block I/O message to the identified primary secure storage appliance, operational flow branches "Yes" and proceeds to transfer request module 2018 which transfers, or forwards, the block level I/O message to the as identified primary secure storage appliance. Thereafter, upon a successful transfer of the block level I/O message to the designated primary secure storage appliance at transfer request module 2018, operational flow proceeds execute request evaluation module 2008. Upon a negative determination at transfer evaluation module 2016 operational flow branches "No" and proceeds to a failover module 2020.

Returning to request evaluation module 2008, upon a negative determination at request evaluation module 2008, indicating that the block level I/O message cannot be successfully executed, operational flow branches "No" and proceeds to failover module 2020. In one embodiment, execution of failover module 2020 corresponds to the transfer of the block level I/O message to a secondary secure storage appliance as identified via accessing a local copy of a network configuration database. The described actions of failover module 2020 can further be executed upon transfer of operational flow upon a negative determination at transfer evaluation module 2016, as described above. In the example embodiment, a successful failover corresponds to reassigning of the volume associated with the block I/O message to a secondary secure appliance and disassociating the respective volume from the primary secure storage appliance, thereby rendering the secondary secure appliance a new primary secure storage appliance.

Upon execution of the transfer of the block level I/O message to the secondary secure storage appliance at failover module 2020, operational flow proceeds back to request evaluation module 2008 such that an evaluation can occur to determine if the block level I/O message can be executed by the secondary secure storage appliance, as described above. Operational flow continues between request evaluation module 2008 and failover module 2020 until a valid failover can occur in which the block level I/O message can be successfully executed.

Upon a positive determination at request evaluation module 2008, indicating that the block level I/O message can be successfully executed, operational flow branches "Yes" and proceeds to a process read/write request module 2010 in which the block level I/O message is processed. In the context of a write operation, read/write process module 2010 operates to cryptographically split and encrypt the block level I/O message, as described above in FIGS. 8 and 16. In the context of a read operation, read/write process module 2010 operates to access and decrypt data on a block level I/O, in further accordance with the principles described above with reference to FIGS. 9 and 15.

Upon completion of the block level I/O message processing read/write process module 2010, operational flow proceeds to error process module 2012. Error process module 2012 operates to determine if at least one failover event was executed at failover module 2020. Upon a negative determination at error process module 2010 operational flow branches "No" and proceeds to end operation 2014. Upon a positive determination at error process module 2012, operational flow branches "Yes" and proceeds to transfer error module 2022. Transfer error module 2022 operates to transfer an error message to an administrator device of the network. Following a successful operation at transfer error module 2022, operational flow proceeds to end operation 2014, which corresponds to termination of the example systems and methods 2000.

Figure 21:
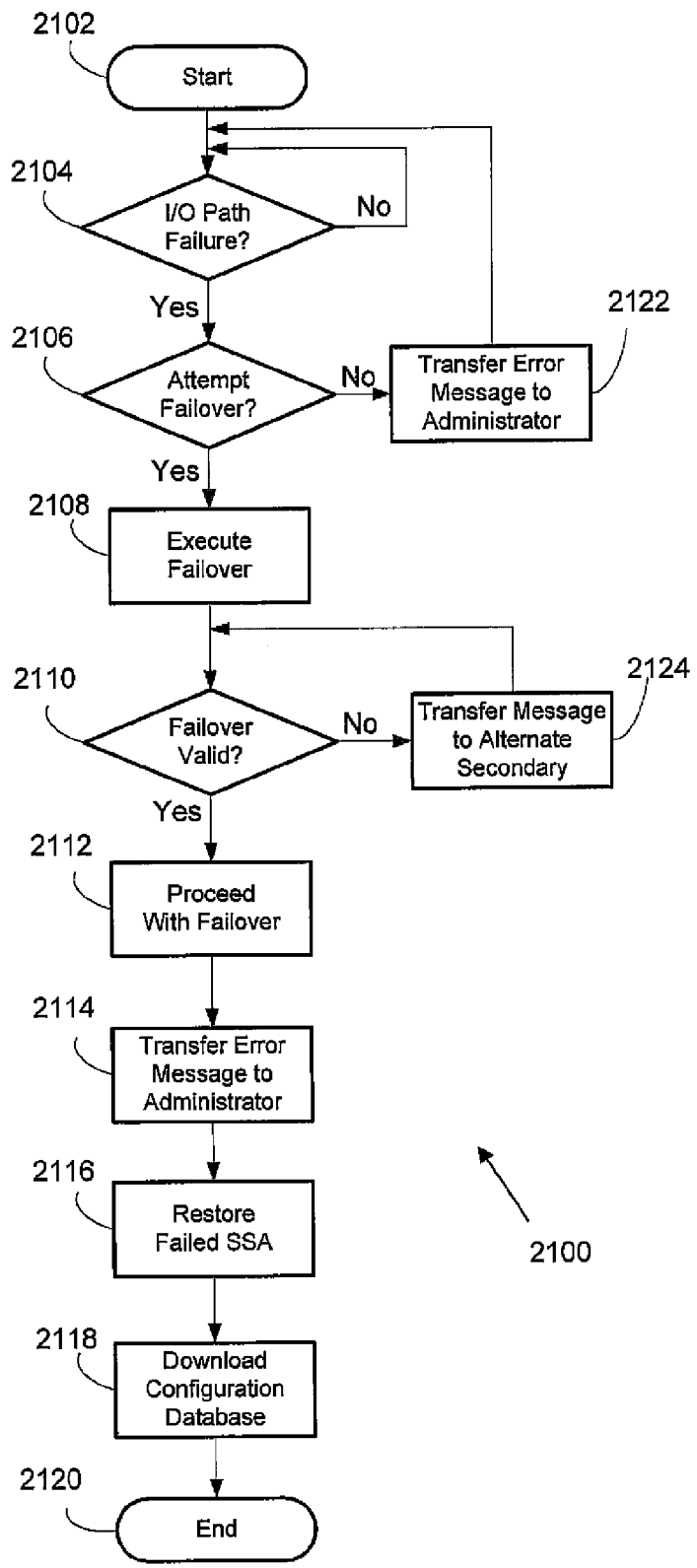
FIG. 21 shows a flowchart of systems and methods for failover resulting from one or more communication path failures according to a possible embodiment of the present disclosure.

Referring now to FIG. 21, systems and methods 2100 for implementing a failover from a primary secure storage appliance to a secondary secure storage appliance in a multi-path computer network based on I/O communication path failure is provided according to principles of the present disclosure. The disclosed systems and methods 2100 enable failover on an individual volume basis via monitoring of a plurality of I/O communication paths in the computer network. In certain embodiments, the multi-path computer network is a clustered computer network as described with reference to FIGS. 12 and 19. In this manner, failover may generally occur between secure storage appliances located in separate clusters or between secure storage appliances located within similar cluster. Further, the secure storage appliance of the disclosed systems and methods 2100 provide a block-level cryptographic data splitting service as described in part with reference to FIGS. 8-9, 15-16 and further throughout the present disclosure.

In the example systems and methods 2100, operational flow is instantiated at a start operation 2102. In one embodiment, start operation 2102 corresponds to one or more elements of the multi-path computer network coming on-line, such as for example the primary and secondary secure storage appliance, and a plurality of further respective secure storage appliances, storage devices, client devices, and administrator device.

In one embodiment, the primary secure storage appliance is configured at the administrator device via an administrative interface as the primary secure storage appliance by assigning a volume to the primary secure storage appliance, the volume being presented as a virtual disk to a respective client device and mapped to physical storage at one or more storage devices. In a similar manner, the secondary secure storage appliance can be configured as such by the administrator. Further, in certain embodiments, the administrative interface presents the primary, and remaining non-primary secure storage appliances as a single virtual secure storage appliance. In the example embodiment, the virtual secure storage appliance presents a common set of administrative settings for each of the plurality of secure storage appliances associated with the virtual secure storage appliance, the common set of administrative settings remaining accessible to the administrator despite a failure of a respective secure storage appliance.

Further, a plurality of I/O communication paths between the secure storage appliances and clients in the network are provided, in which each respective client represents a valid I/O path to any of the plurality of secure storage appliances. Further still, a plurality of I/O communication paths between respective secure storage appliances and storage devices are provided.

Operational flow proceeds to a monitor I/O path module 2104. Monitor I/O path module 2104 corresponds to each of the plurality of secure appliance servers in the network periodically evaluating the status of the plurality of I/O communication paths in the network. In a first aspect, monitor I/O path module 2104 monitors and records the operational status of a plurality of front-end network I/O paths between a primary secure storage appliance and a respective client device that associates a virtual disk therewith. In a second aspect, I/O path module 2104 periodically monitors and records the operational status of a plurality of back-end network I/O paths between a primary secure storage appliance and one or more storage devices. Upon a negative determination at monitor I/O path module 2104, indicative of no I/O path failures in the front-end network and/or the back-end I/O network, operational flow branches "No" and proceeds to monitor I/O path module 2104 for a subsequent I/O path evaluation after a predetermined time period. Upon a positive determination at monitor I/O path module 2104, indicating at least one front-end and/or back-end I/O path failure, operational flow branches "Yes" and proceeds to a failover evaluation module 2106.

Failover evaluation module 2106 corresponds to an evaluation of the severity or extent of the at least one front-end and/or back-end I/O path failure as assessed at monitor I/O path module 2104. In the context of a front-end I/O path failure, failover evaluation module 2106 proceeds to make a determination if a potential I/O message as presented by the client can be received by the primary secure storage appliance via at least one I/O path in the front-end network. In the example embodiment, a positive evaluation at failover evaluation module 2106 would indicate that a potential I/O message as presented by the client would not be received by the designated primary secure storage appliance, and operational flow branches "Yes" and proceeds to an execute failover module 2108.

Upon a negative determination at failover evaluation module 2106, indicating that a potential I/O message as presented by the client would eventually be received by the designated primary secure storage appliance, operational flow branches "No" and proceeds to an error message transfer module 2122, which transfers or forwards an error message to the administrator such that the I/O path failure can be addressed. Upon successful transmission of the error message at error message transfer module 2122, operational flow proceeds to monitor I/O path module 2104 to continue a periodic I/O path evaluation, as described above.

In the context of a back-end I/O path failure, failover evaluation module 2106 proceeds to make a determination of the total number storage devices that are positively accessible by the primary secure storage appliance, such that in the event that a potential I/O message as presented by the client would require access to a designated number of storage devices greater than the total number of accessible storage devices, a failover would be required. For example, if an I/O message requires access to M of N shares to reconstruct a volume, yet the number of relevant accessible storage devices is less than M, a failover would be required to maintain data availability, and operational flow would proceed to execute failover module 2108 for immediate action. Upon a negative determination at failover evaluation module 2106, indicating that a potential I/O message as presented by the client would be executable based on the total number of accessible storage devices, a failover would be not required and operational flow branches "No" and proceeds to the error message transfer module 2122, which transfers or forwards an error message to the administrator such that the I/O path failure can be addressed, as described above.

Returning to failover evaluation module 2106 in which a positive determination is made, thereby indicating: a) a front-end network based failure such that a potential I/O message as presented by the client would not be received by the designated primary secure storage appliance; or b): a back-end network based failure such that a potential I/O message as presented by the client would require access to a designated number of storage devices greater than the total number of accessible storage devices, operational flow branches "Yes" and proceeds to execute failover module 2108. Execute failover module 2108 corresponds to the transfer of an inquiry message to a first secondary secure appliance to determine if the first secondary secure appliance is capable of being assigned a respective volume associated with the potential I/O message. In one embodiment, the determination is made via accessing a local copy of a network configuration database in which a common set of administrative settings, such as primary and secondary secure storage appliance configurations, are defined on an individual volume basis.

Upon a successful transmission of the inquiry message to the first secondary secure appliance at execute failover module 2108, operational flow proceeds to a failover evaluation module 2110. In one embodiment, failover evaluation module 2110 corresponds to a determination if a potential block level I/O message can be successfully executed by the first secondary secure appliance. In one aspect, the determination is made via an assessment of the operational status of a plurality of elements in the multi-path network. For example, an evaluation can be performed to determine the operational status of relevant front-end 605*a* and back-end 605*b* I/O communication paths to determine if a block level I/O message can be executed. Other diagnostic network analysis may be considered as well.

Upon a positive determination at failover evaluation module 2110, operational flow branches "Yes" and proceeds to a failover proceed module 2112, in which the volume is reassigned such that the first secondary secure appliance is rendered as the new primary secure storage appliance, and further disassociating the respective volume from the primary secure storage appliance. Upon a negative determination failover evaluation module 2110, indicating that a potential block level I/O message cannot be successfully executed by the first secondary secure appliance, operational flow branches "No" and proceeds to a backup failover attempt module 2124. Backup failover attempt module 2124 corresponds to a transfer of an inquiry message from a secondary secure appliance to an alternate secondary secure appliance. In one example embodiment, the alternate secondary secure appliance is identified via accessing a local copy of a network configuration database, as described above. Upon a successful transmission of the inquiry message from first secondary secure appliance to an alternate secondary secure appliance at backup failover attempt module 2124, operational flow proceeds back to failover evaluation module 2110. Operational flow continues between failover evaluation module 2110 and backup failover attempt module 2124 until it is determined that a valid failover can occur.

Returning now to determination failover evaluation module 2110 in which a positive determination is made, operational flow branches "Yes" and proceeds to failover proceed module 2112. As described above, failover proceed module 2112 corresponds to reassignment of the volume to a secondary secure storage appliance such that the secondary secure storage appliance is rendered as the new primary secure storage appliance. Further the respective volume is disassociated from the primary secure storage appliance. In certain embodiments, failover proceed module 2112 further corresponds to the secondary secure storage appliance configuring one or more secure front-end network data paths to the respective client and configuring one or more secure back-end data paths to one or more storage devices, such that an I/O may be successfully executed. Upon successful execution of a plurality of operations at failover proceed module 2112, operational flow proceeds to an error message transfer module 2114, which transfers or forwards an error message to the administrator such that the I/O path failure and failover can be addressed and/or investigated.

Upon successful transmission of the error message at error message transfer module 2114, operational flow proceeds to restore operation module 2116. In certain embodiments, restore operation module 2116 corresponds to a restoration of operation of the failed secure storage appliance, and possible restoration of the failed secure storage appliance as the primary secure storage appliance for the respective volume. Operational flow proceeds to a copy database module 2118. Copy database module 2118 corresponds to a transfer of a copy of an updated configuration database to the failed primary secure storage appliance as restored at restore operation module 2116. In certain embodiments, copy database module 2118 is executed at the secondary secure storage appliance that assumed the role as the new primary secure storage appliance detects the restoration of the failed secure storage appliance at restore operation module 2116. Subsequently, the secondary secure storage appliance transfers a copy of the updated configuration database to the newly operational secure storage appliance. In other embodiments, the updated configuration database can be transferred to the newly operational secure storage appliance by an administrator device (e.g., the administrator device 614 of FIGS. 12 and 19). Following a successful operation at copy database module 2118, indicating the restored secure storage appliance has obtained an updated configuration database, operational flow proceeds to end operation 2120, which corresponds to termination of the example systems and methods 2100.

Figure 22:
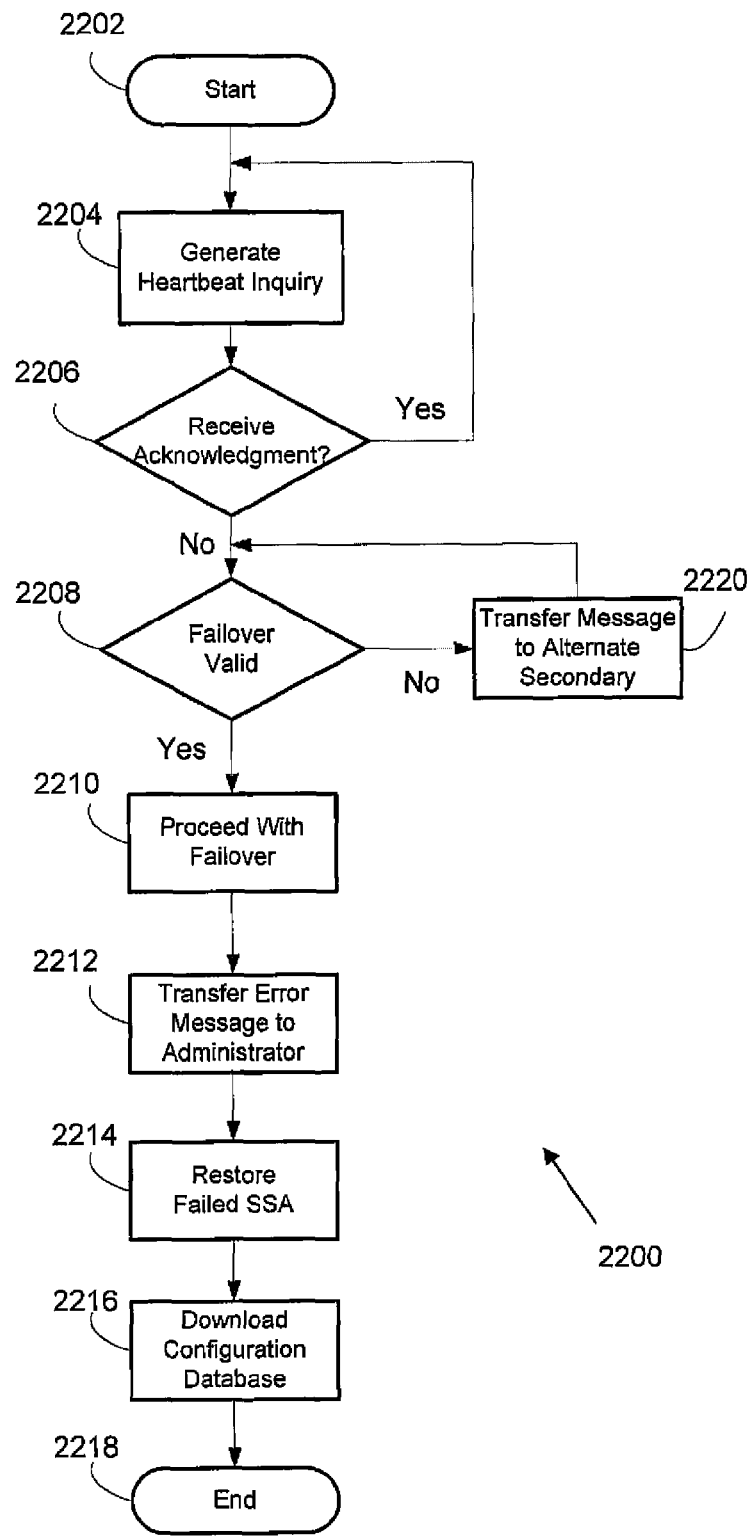
FIG. 22 shows a flowchart of systems and methods for failover resulting from a secure storage appliance failure according to a possible embodiment of the present disclosure.

Referring now to FIG. 22, systems and methods 2200 for implementing a failover between a primary secure storage appliance and a secondary secure storage appliance in a multi-path computer network based on a primary secure storage appliance failure is provided according to principles of the present disclosure. The disclosed systems and methods 2200 enable failover on an individual virtual disk basis by monitoring primary secure storage appliance operational status with a heartbeat signal. Further, the secure storage appliance of the disclosed systems and methods 2200 provide a block-level cryptographic data splitting service as described in part with reference to FIGS. 8-9, 15-16 and further throughout the present disclosure.

In the example systems and methods 2200, operational flow is instantiated at a start operation 2202. In one embodiment, start operation 2202 corresponds to one or more elements of the multi-path computer network coming on-line, such as for example the primary and secondary secure storage appliance, and a plurality of further respective secure storage appliances, storage devices, client devices, and administrator device.

In one embodiment, the primary secure storage appliance is configured at the administrator device via an administrative interface as the primary secure storage appliance by assigning a volume to the primary secure storage appliance, the volume being presented as a virtual disk to a respective client device and mapped to physical storage at one or more storage devices. In a similar manner, the secondary secure storage appliance can be configured as such by the administrator. Further, in certain embodiments, the administrative interface presents the primary, secondary, and remaining plurality of secure storage appliances as a single virtual secure storage appliance. In the example embodiment, the virtual secure storage appliance presents a common set of administrative settings for each of the plurality of secure storage appliances associated with the virtual secure storage appliance, the common set of administrative settings remaining accessible to the administrator despite a failure of a respective secure storage appliance.

Operational flow proceeds to a heartbeat generation module 2204. In general, heartbeat generation module 2204 corresponds to the transmission and reception of a operational status signal (heartbeat signal) a primary secure storage appliance and a secondary secure storage appliance to determine if each respective secure storage appliance is functioning correctly. In one example embodiment, a physical communication path is formed between the primary secure storage appliance and the secondary secure storage appliance to facilitate the transmission and reception of the heartbeat signal, such as via a TCP/IP communication path. Other transmission methods are possible as well. In the example embodiment, from a perspective of the secondary secure storage appliance, upon successful transmission of a heartbeat status signal to the primary secure storage appliance at heartbeat generation module 2204, operational flow proceeds to a heartbeat acknowledgment module 2206.

In one aspect, heartbeat acknowledgment module 2206 corresponds to reception of an acknowledgement heartbeat signal from the primary secure storage appliance, indicating proper functional operation of the primary secure storage appliance. Upon a positive reception of the heartbeat signal at the secondary secure storage appliance, operational flow branches "Yes" and proceeds to heartbeat generation module 2204. Operational flow continues between heartbeat generation module 2204 and heartbeat acknowledgment module 2206 until a negative determination is made at heartbeat acknowledgment module 2206, indicating an absence of a heartbeat signal, and consequently a potential error in the operating status of the primary secure storage appliance.

Upon a negative determination at heartbeat acknowledgment module 2206, operational flow branches "No" and proceeds to a failover evaluation module 2208. In one aspect, failover evaluation module 2208 proceeds to determine if a potential block level I/O message can be executed by the secondary secure storage appliance via an assessment of the status of a plurality of elements in the network. For example, the secondary secure storage appliance can determine if a requisite number of functioning front-end network and back-end network secure data paths are available to secondary secure storage appliance such than an I/O message can be executed, in accordance with conditions as described above with reference to FIGS. 19-21.

Upon a negative determination at failover evaluation module 2208 operational flow branches "No" and proceeds to a backup failover attempt module 2220. In one aspect, execution of backup failover attempt module 2220 corresponds to a transfer of an inquiry message from the secondary secure storage appliance to an alternate secondary secure storage appliance. In one example embodiment, the alternate secondary secure storage appliance is identified via accessing a local copy of a network configuration database in which a common set of administrative settings, such as primary and secondary secure storage appliance configurations, are defined on an individual volume basis. Upon a successful transmission of the inquiry message from the secondary secure storage appliance to the alternate secondary secure storage appliance at backup failover attempt module 2220, operational flow proceeds failover evaluation module 2208. Operational flow continues between failover evaluation module 2208 and backup failover attempt module 2220 until it is determined that a valid failover can occur.

Upon a positive determination at failover evaluation module 2208, indicating that a potential I/O message as presented by the client would be executable, operational flow branches "Yes" and proceeds to a failover proceed module 2210. In one aspect, execution of failover proceed module 2210 corresponds to a reassignment of the volume to the secondary secure storage appliance such that the secondary secure storage appliance is rendered as the new primary secure storage appliance. Further the respective volume is disassociated from the primary secure storage appliance. In certain embodiments, failover proceed module 2210 further corresponds to the secondary secure storage appliance configuring one or more secure front-end network data paths to the respective client and configuring one or more secure back-end data paths to a one or more storage devices. Upon a successful execution of failover proceed module 2210, operational flow proceeds to an error message transfer module 2212, which transfers or forwards an error message to the administrator such that the I/O path failure and failover can be addressed and/or investigated.

Upon successful transmission of the error message at error message transfer module 2212, operational flow proceeds to restore operation module 2214. In certain embodiments, restore operation module 2214 corresponds to a restoration of operation of the failed secure storage appliance, and possible restoration of the failed secure storage appliance as the primary secure storage appliance for the respective volume. Operational flow proceeds to a copy database module 2216. Copy database module 2216 corresponds to a transfer of a copy of an updated configuration database to the failed primary secure storage appliance as restored at restore operation module 2214. In certain embodiments, copy database module 2216 is executed at the secondary secure storage appliance that assumed the role as the new primary secure storage appliance detects the restoration of the failed secure storage appliance at restore operation module 2214. Subsequently, the secondary secure storage appliance transfers a copy of the updated configuration database to the newly operational secure storage appliance. In other embodiments, the updated configuration database can be transferred to the newly operational secure storage appliance by an administrator device (e.g., the administrator device 614 of FIGS. 12 and 19). Following a successful operation at copy database module 2216, indicating the restored secure storage appliance has obtained an updated configuration database, operational flow proceeds to end operation 2218, which corresponds to termination of the example systems and methods 2200.

Although FIGS. 19-22 present a few options regarding failover and failover techniques for applications of the secure storage appliance and secure network storage of data as described in the present disclosure, it is understood that further applications are possible as well. Furthermore, although each of these applications is described in conjunction with a particular network topology, it is understood that a variety of network topologies could be implemented to provide similar functionality, in a manner consistent with the principles described herein.

It is recognized that the above networks, systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of maintaining data connectivity in a secure data storage network, the method comprising:
   assigning a volume to a primary secure storage appliance located in a secure data storage network the primary secure storage appliance selected from among a plurality of secure storage appliances located in the secure data storage network, the volume presented as a virtual disk to a client device and mapped to a physical storage at each of a plurality of storage systems;
   storing data, by the primary secure storage appliance, in the volume as blocks spread across the plurality of storage systems, the data stored across the plurality of storage systems are cryptographically split into a plurality of secondary data blocks that are stored in separate volumes;
   detecting at one of the plurality of secure storage appliances a failure of the primary secure storage appliance;
   upon detecting the failure of the primary secure storage appliance, reassigning the volume to a second secure storage appliance from among the plurality of secure storage appliances, thereby rendering the second secure storage appliance a new primary secure storage appliance;
   wherein in cryptographically splitting the data into the plurality of secondary data blocks utilizes a plurality of encryption keys to create a plurality of separate community of interest of data sets in which the data sets and corresponding plurality of secondary data blocks are members of the community of interest associated with the one of the plurality of encryption keys used in the write requests.

2. The method of claim 1, wherein detecting the failure of the primary secure storage appliance includes determining an absence of a heartbeat signal transmitted periodically among the plurality of secure storage appliances.

3. The method of claim 1, wherein the plurality of secure storage appliances are connected within a cluster.

4. The method of claim 1, further comprising, upon reassigning the volume to a second secure storage appliance, sending an error message to an administrator of the secure data storage network.

5. The method of claim 1, wherein the primary secure storage appliance and the second secure storage appliance are each connected to the plurality of storage systems.

6. The method of claim 1, further comprising presenting an administrative interface to an administrator of the secure data storage network, the administrative interface presenting the plurality of secure storage appliances as a virtual secure storage appliance.

7. The method of claim 6, further comprising presenting a common set of administrative settings for each of the plurality of secure storage appliances associated with the virtual secure storage appliance.

8. The method of claim 7, wherein the common set of administrative settings is stored at each of the plurality of secure storage appliances.

9. The method of claim 1, further comprising restoring operation of the primary secure storage appliance.

10. The method of claim 9, further comprising detecting restoration operation of the primary secure storage appliance at one of the plurality of secure storage appliances.

11. The method of claim 10, further comprising restoring a common set of administrative settings for the plurality of secure storage appliances to the primary secure storage appliance.

12. The method of claim 10, further comprising reassigning the volume to the primary secure storage appliance and disassociating the second secure storage appliance from the volume.

13. A secure data storage network comprising:
   a client device;
   a plurality of storage systems;
   a plurality of secure storage appliances interconnected between the client device and the plurality of storage systems, the plurality of secure storage appliances including a primary secure storage appliance associated with a volume, the volume presented as a virtual disk to the client device and mapped to a physical storage at each of the plurality of storage systems;
   wherein each of the plurality of secure storage appliances includes a common set of administrative information, and each of the plurality of secure storage appliances monitors operational status of one or more of a different secure storage appliance among the plurality of secure storage appliances;

wherein data is stored in the volume as blocks spread across the plurality of storage systems by the primary secure storage appliance and the data stored in the volume being cryptography split into a plurality of secondary data blocks that are stored in separate volumes of virtual disks; and the cryptographically splitting the data into the plurality of secondary data blocks utilizes a plurality of encryption keys to create a plurality of separate community of interest of data sets in which the data sets and corresponding plurality of secondary data blocks are members of the community of interest associated with the one of the plurality of encryption keys used in write requests.

14. The secure data storage network of claim 13, wherein each of the plurality of secure storage appliances is configured to periodically transmit a heartbeat message to another secure storage appliance from among the plurality of secure storage appliances.

15. The secure data storage network of claim 13, further comprising an administrative interface hosted by an administrative console, the administrative interface providing a view of a virtual secure storage appliance representing the plurality of secure storage appliances and presenting a common set of administrative settings associated with the plurality of secure storage appliances.

16. The secure data storage network of claim 13, wherein the plurality of secure storage appliances reside within a cluster in the secure data storage network.

* * * * *